United States Patent
Fournell et al.

(10) Patent No.: US 10,820,604 B2
(45) Date of Patent: Nov. 3, 2020

(54) MICROFILTRATION OF HUMAN MILK TO REDUCE BACTERIAL CONTAMINATION

(75) Inventors: Joseph Fournell, Monrovia, CA (US); Scott Eaker, Monrovia, CA (US); Armando Montoya, Monrovia, CA (US)

(73) Assignee: Prolacta Bioscience, Inc., City of Industry, CA (US)

( * ) Notice: Subject to any disclaimer, the term of this patent is extended or adjusted under 35 U.S.C. 154(b) by 604 days.

(21) Appl. No.: 13/566,753

(22) Filed: Aug. 3, 2012

(65) Prior Publication Data

US 2013/0059050 A1   Mar. 7, 2013

Related U.S. Application Data

(60) Provisional application No. 61/514,673, filed on Aug. 3, 2011.

(51) Int. Cl.
  *A23C 9/142* (2006.01)
  *A23C 9/20* (2006.01)

(52) U.S. Cl.
  CPC ............ *A23C 9/1422* (2013.01); *A23C 9/206* (2013.01); *A23C 2210/208* (2013.01)

(58) Field of Classification Search
  CPC .... A23C 7/04; A23C 7/00; A23C 7/02; A23C 7/046; A01J 11/10; A01J 11/06; A01J 9/02; A01J 11/00; A01K 9/00; A01K 9/02
  USPC .................................. 426/580, 491; 210/202
  See application file for complete search history.

(56) References Cited

U.S. PATENT DOCUMENTS

| | | |
|---|---|---|
| 2,155,843 A | 4/1939 | Schmidt |
| 2,173,922 A | 9/1939 | Supplee |
| 2,567,898 A | 9/1951 | Staaff |
| 3,896,241 A | 7/1975 | Malaspina et al. |
| 3,946,113 A | 3/1976 | Seiberling |
| 4,362,697 A | 12/1982 | Tabb et al. |
| 4,455,483 A | 6/1984 | Schonhuber |
| 4,762,822 A | 8/1988 | Ettinger |
| 4,772,262 A | 9/1988 | Grant et al. |
| 4,876,100 A | 10/1989 | Holm et al. |
| 4,948,599 A | 8/1990 | Sagara et al. |
| 5,064,674 A | 11/1991 | Girsh |
| 5,169,766 A | 12/1992 | Schuster et al. |

(Continued)

FOREIGN PATENT DOCUMENTS

| | | |
|---|---|---|
| EP | 1637043 A1 | 3/2006 |
| GB | 1451747 A | 10/1976 |

(Continued)

OTHER PUBLICATIONS

Filter aid comparison chart 2005 downloaded from the internet at http://www.centralindustrialsales.com/filteraid.asp.*

(Continued)

*Primary Examiner* — Amber R Orlando
*Assistant Examiner* — Philip A Dubois
(74) *Attorney, Agent, or Firm* — Cooley LLP

(57) ABSTRACT

The present invention relates to a method for treating raw human milk to produce treated human milk having undetectable levels of bacteria. The milk is skimmed to produce skim human milk then subjected to microfiltration to yield a filtrate which has undetectable levels of bacteria, including *Bacillus cereus*. The resultant human milk can be further processed, used and/or sold.

14 Claims, 6 Drawing Sheets

(56) References Cited

U.S. PATENT DOCUMENTS

| | | | |
|---|---|---|---|
| 5,256,437 A | 10/1993 | Degen et al. | |
| 5,303,598 A | 4/1994 | Binder et al. | |
| 5,334,822 A | 8/1994 | Sanford | |
| 5,401,523 A | 3/1995 | Degen et al. | |
| 5,505,955 A | 4/1996 | Peterson et al. | |
| 5,541,065 A | 7/1996 | Erlich et al. | |
| 5,576,040 A * | 11/1996 | Moller et al. | 426/271 |
| 5,605,689 A | 2/1997 | Ammann | |
| 5,616,483 A | 4/1997 | Bjursell et al. | |
| 5,670,196 A | 9/1997 | Gregory | |
| 5,683,733 A | 11/1997 | Krabsen et al. | |
| 5,707,678 A * | 1/1998 | Gregory | 426/583 |
| 5,972,337 A | 10/1999 | Ceriani et al. | |
| 5,983,198 A | 11/1999 | Mowery et al. | |
| 6,004,288 A | 12/1999 | Hochstedler et al. | |
| 6,017,511 A | 1/2000 | Wong et al. | |
| 6,020,015 A | 2/2000 | Gaull | |
| 6,056,978 A | 5/2000 | Beck et al. | |
| 6,183,803 B1 | 2/2001 | Morcol et al. | |
| 6,194,009 B1 | 2/2001 | Kamarel | |
| 6,270,827 B1 | 8/2001 | Gaull et al. | |
| 6,294,206 B1 | 9/2001 | Barrett-Reis et al. | |
| 6,326,044 B1 | 12/2001 | Lindquist | |
| 6,613,367 B1 | 9/2003 | Wells et al. | |
| 6,635,296 B1 | 10/2003 | Nissen et al. | |
| 6,652,900 B2 * | 11/2003 | Lindquist | 426/522 |
| 6,670,124 B1 | 12/2003 | Chow et al. | |
| 6,737,096 B2 | 5/2004 | Lindquist | |
| 6,780,987 B1 | 8/2004 | Herman et al. | |
| 6,846,298 B1 | 1/2005 | Carr et al. | |
| 6,910,594 B2 | 6/2005 | Foley et al. | |
| 7,867,541 B2 | 1/2011 | McMahon et al. | |
| 7,914,822 B2 | 3/2011 | Medo | |
| 7,943,315 B2 | 5/2011 | Medo et al. | |
| 7,951,410 B2 | 5/2011 | McMahon et al. | |
| 8,278,046 B2 | 10/2012 | Medo et al. | |
| 10,506,818 B2 | 12/2019 | Fournell et al. | |
| 2001/0034614 A1 | 10/2001 | Fletcher-Haynes et al. | |
| 2001/0049096 A1 | 12/2001 | Brown | |
| 2002/0155445 A1 | 10/2002 | Jarvik | |
| 2002/0182243 A1 | 12/2002 | Medo | |
| 2003/0093171 A1 | 5/2003 | Soehnlen | |
| 2003/0152942 A1 | 8/2003 | Fors et al. | |
| 2003/0175701 A1 | 9/2003 | Griffiths et al. | |
| 2003/0219812 A1 | 11/2003 | Quay et al. | |
| 2004/0181205 A1 | 9/2004 | Morton et al. | |
| 2004/0265462 A1 | 12/2004 | Carlson | |
| 2005/0053707 A1 | 3/2005 | Kopf et al. | |
| 2005/0096295 A1 | 5/2005 | McMahon et al. | |
| 2005/0100634 A1 | 5/2005 | Medo | |
| 2005/0189285 A1 | 9/2005 | Brocheton et al. | |
| 2005/0214358 A1 | 9/2005 | Mikoshiba et al. | |
| 2005/0220894 A1 | 10/2005 | Williams et al. | |
| 2006/0115558 A1 | 6/2006 | Lamothe | |
| 2006/0204632 A1 | 9/2006 | Barrett-Reis et al. | |
| 2006/0233915 A1 | 10/2006 | Puski et al. | |
| 2007/0098863 A1 | 5/2007 | Medo et al. | |
| 2007/0104700 A1 | 5/2007 | Garcia-Rodenas et al. | |
| 2007/0178213 A1 | 8/2007 | Ketchmark et al. | |
| 2007/0203802 A1 | 8/2007 | Medo et al. | |
| 2007/0224332 A1 | 9/2007 | Sugimoto et al. | |
| 2008/0102162 A1 | 5/2008 | Delcour et al. | |
| 2008/0118615 A1 | 5/2008 | Hartmann et al. | |
| 2008/0124430 A1 * | 5/2008 | Medo et al. | 426/74 |
| 2008/0187619 A1 | 8/2008 | Hartmann et al. | |
| 2008/0227101 A1 | 9/2008 | Medo et al. | |
| 2008/0254165 A1 | 10/2008 | Patel et al. | |
| 2008/0274230 A1 | 11/2008 | Johns et al. | |
| 2009/0181848 A1 | 7/2009 | Lenz et al. | |
| 2009/0203592 A1 | 8/2009 | Beermann et al. | |
| 2009/0258121 A1 | 10/2009 | Medo | |
| 2010/0159093 A1 | 6/2010 | Alatossava et al. | |
| 2010/0268658 A1 | 10/2010 | Medo et al. | |
| 2010/0280115 A1 | 11/2010 | Medo et al. | |
| 2010/0310711 A1 | 12/2010 | Kendall | |
| 2011/0123514 A1 | 5/2011 | Mcdonagh et al. | |
| 2011/0130545 A1 | 6/2011 | Hensgens et al. | |
| 2011/0135797 A1 | 6/2011 | Li et al. | |
| 2011/0206684 A1 | 8/2011 | Medo | |
| 2011/0311689 A1 | 12/2011 | Medo et al. | |
| 2018/0042255 A1 | 2/2018 | Fournell et al. | |

FOREIGN PATENT DOCUMENTS

| | | |
|---|---|---|
| JP | 61-33895 U | 1/1986 |
| JP | S62-500141 T | 1/1987 |
| JP | 64-67141 A | 3/1989 |
| JP | H06-062695 A | 3/1994 |
| JP | 6-303900 A | 11/1994 |
| JP | 2002-532074 A | 10/2002 |
| JP | 2002-540806 A | 12/2002 |
| JP | 2005-525116 A | 8/2005 |
| JP | 2007-202567 A | 8/2007 |
| JP | 2010-502186 T | 1/2010 |
| JP | 2010-510811 T | 4/2010 |
| SE | 380422 B | 11/1975 |
| WO | WO 1998/57549 | 12/1998 |
| WO | WO 00/43550 A2 | 7/2000 |
| WO | WO 2005/013709 A1 | 2/2005 |
| WO | WO 2005/051088 A2 | 6/2005 |
| WO | WO 2005/084129 A2 | 9/2005 |
| WO | WO 2006/026878 A1 | 3/2006 |
| WO | WO 2006/026879 A1 | 3/2006 |
| WO | WO 2007/035870 A2 | 3/2007 |
| WO | WO 2008/027572 A1 | 3/2008 |
| WO | WO 2008/067486 A2 | 6/2008 |
| WO | WO 2008/073888 A2 | 6/2008 |
| WO | WO 2010/030764 A2 | 3/2010 |
| WO | WO 2012/030764 A2 | 3/2012 |
| WO | WO 2013/020081 A2 | 2/2013 |

OTHER PUBLICATIONS

Lapillione, et al., "Mineral balance and whole body bone mineral content in very low-birth-weight infants", (1994) Acta Pediatrica 84 (s405):117-122.

Melegh, et al., "Changes of Plasma Free Amino Acids and Renal Clearances of Carnitines in Premature Infants During L-Carnitine-Supplemental Human Milk Feeding", (1998) J. Pediatric Gastroenterol. Nutr. 7(3):424-429.

Salle, et al., "Effects of Calcium and Phosphorus Supplementation on Calcium Retention and Fat Absorption in Preterm Infants Fed Pooled Human Milk", (1986) J. Pediatric Gastroenterol. Nutr. 5(4):638-642.

"International Search Report," 2 pages, PCT appl. No. PCT/US2012/049590 (dated Oct. 1, 2012).

"Written Opinion of the International Searching Authority," 6 pages, PCT appl. No. PCT/US2012/049590 (dated Oct. 1, 2012).

Arnold, Human Milk in the NICU. Policy Into Practice. (2010); pp. 3-11, pp. 15-46; pp. 191-207; pp. 311-367, 121 pages.

Black, et al., "Incremental Hospital Costs Associated With Comorbidities of Prematurity". Managed Care Magazine Online (Dec. 2015); downloaded on Jan. 25, 2017 at https://www.managedcaremag.com/linkout/2015/12/54, 14 pages.

Bloom, B.T., "Safety of donor milk: a brief report". Journal of Perinatology (May 2016); 36(5): 392-393. Epub Jan. 7, 2016.

Edmond and Bahl, "Optimal feeding of low-birth-weight infants." World Health Organization (2006); pp. 1-121, 131 pages.

Extended European Search Report in Application No. EP 12820641.4 dated Apr. 23, 2015, 5 pages.

Ford, et al., "Improved feeding tolerance and growth are linked to increased gut microbial community diversity in very-low-birth-weight infants fed mother's own milk compared with donor breast milk". The American Journal of Clinical Nutrition (Apr. 1, 2019); 109(4): 1088-1097.

Ganapathy, "Long term healthcare costs of infants who survived neonatal necrotizing enterocolitis: a retrospective longitudinal study among infants enrolled in Texas Medicaid". BMC Pediatrics (Aug. 20, 2013); 13: 127, 11 pages.

(56) References Cited

OTHER PUBLICATIONS

Hair, et al., "Beyond Necrotizing Enterocolitis Prevention: Improving Outcomes with an Exclusive Human Milk-Based Diet". Breastfeeding Medicine (Mar. 2016); 11(2): 70-74. Epub Jan. 20, 2016.
Hair, et al., "Beyond Necrotizing Enterocolitis: Other Clinical Advantages of an Exclusive Human Milk Diet". Breastfeeding Medicine (Jul./Aug. 2018); 13(6): 408-411. Epub Jun. 7, 2018.
Heiman and Schanler, "Benefits of maternal and donor human milk for premature infants." Early Human Development (2006); 82 (12): 781-787.
Herrmann and Carroll, "An Exclusively Human Milk Diet Reduces Necrotizing Enterocolitis". Breastfeeding Medicine (May 1, 2014); 9(4): 184-190.
Hicks, et al., "Calcium Absorption in Very Low Birth Weight Infants with and without Bronchopulmonary Dysplasia". The Journal of Pediatrics (Jun. 2011); 158(6): 885-890.e1. Epub Feb. 6, 2011.
Huston, et al., "Decreasing Necrotizing Enterocolitis and Gastrointestinal Bleeding in the Neonatal Intensive Care Unit: The Role of Donor Human Milk and Exclusive Human Milk Diets in Infants ≤1500 g Birth Weight". ICAN: Infant, Child, & Adolescent Nutrition (Jan. 10, 2014); 6(2): 86-93.
Huston, et al., "Improving Growth for Infants ≤1250 Grams Receiving an Exclusive Human Milk Diet". Nutrition in Clinical Practice (Oct. 2018); 33(5): 671-678. Epub Feb. 16, 2018.
International Preliminary Report on Patentability, PCT appl. No. PCT/US2012/049590 dated Apr. 1, 2014, 7 pages.
Khandelwal, et al., "A Pilot Study of Human Milk to Reduce Intestinal Inflammation After Bone Marrow Transplant". Breastfeeding Medicine (Apr. 2019); 14(3):193-202. Epub Mar. 27, 2019.
Kornhauser and Schneiderman, "How Plans Can Improve Outcomes and Cut Costs for Preterm Infant Care." Managed Care (Jan. 2010); 19(1): 28-30.
Kuzma-O'Reilly, B., et al., "Evaluation, Development, and Implementation of Potentially Better Practices in Neonatal Intensive Care Nutrition." Pediatrics (2003); 111 (4): e461-e470, 12 pages.
Lucas and Cole, "Medical Science". The Lancet (1980); 336(8730-8731): 1519-1523.
Lucas, et al., "Breast milk and subsequent intelligence quotient in children born preterm". The Lancet (Feb. 1, 1992); 339(8788): 261-264.
Lucas, et al., "Randomised trial of early diet in preterm babies and later intelligence quotient". BMJ (Nov. 28, 1998); 317(7171): 1481-1487.
Pietz, J., et al., "Prevention of Necrotizing Enterocolitis in Preterm Infants: A 20-Year Experience." Pediatrics (2007); 119 (1): e164-e170, 9 pages.
Rechtman, et al., "Effect of Environmental Conditions on Unpasteurized Donor Human Milk". Breastfeeding Medicine (2006 Spring); 1(1): 24-26.
Reeves, et al., "TGF-β2, a Protective Intestinal Cytokine, Is Abundant in Maternal Human Milk and Human-Derived Fortifiers but Not in Donor Human Milk". Breastfeeding Medicine (Dec. 2013); 8(6): 496-502. Epub Jul. 19, 2013.
Sandhu, et al., "Human-Based Human Milk Fortifier as Rescue Therapy in Very Low Birth Weight Infants Demonstrating Intolerance to Bovine-Based Human Milk Fortifier". Breastfeeding Medicine (Nov. 2017); 12(9): 570-573. Epub Aug. 4, 2017.
Schanler, "Mother's Own Milk, Donor Human Milk, and Preterm Formulas in the Feeding of Extremely Premature Infants." Journal of Pediatric Gastroenterology and Nutrition (2007); 45 (Suppl 3): S175-S177.
Schanler, et al., "Randomized Trial of Donor Human Milk Versus Preterm Formula as Substitutes for Mothers' Own Milk in the Feeding of Extremely Premature Infants". Pediatrics (Aug. 2005); 116(2): 400-406.
Visuthranukul, C., et al., "Premature small for gestational age infants fed an exclusive human milk-based diet achieve catch-up growth without metabolic consequences at 2 years of age". Arch Dis Child Fetal Neonatal Ed. (May 2019); 104(3): F242-F247. doi: 10.1136/archdischild-2017-314547. Epub Nov. 13, 2018.

Wight, N.E., et al., Best Medicine: Human Milk in the NICU (2008); pp. xi-xiv, pp. 1-7, pp. 9-32, pp. 43-96, 91 pages.
U.S. Appl. No. 11/947,580, filed Nov. 29, 2007.
U.S. Appl. No. 12/518,237, filed May 17, 2010.
U.S. Appl. No. 13/033,324, filed Feb. 23, 2011.
U.S. Appl. No. 13/592,678, filed Aug. 23, 2012.
U.S. Appl. No. 12/728,811, filed Mar. 22, 2010.
U.S. Appl. No. 12/438,789, filed Jul. 12, 2011.
U.S. Appl. No. 13/132,545, filed Jul. 7, 2011.
U.S. Appl. No. 13/605,223, filed Sep. 6, 2012.
Arnold, "How North American Donor Banks Operate: Results of a Survey: Part 1," J. Hum. Lact. 13(2):159-162 (1997).
Arnold, "How North American Donor Banks Operate: Results of a Survey: Part 2," J. Hum. Lact. 13(3):243-246 (Sep. 1997).
Arnold, "How to Order Banked Donor Milk in the United States: What the Health Care Provider Needs to Know," J. Hum. Lact. 14(1):65-67 (1998).
Bernshaw, "Milk Banking: An Idea That Has Come of Age. Non-Profit Milk Banking," Seminar delivered on Aug. 29, 2006. Retrieved from the internet: http://www.utahbreastfeeding.org/business/2006_08_MilkBankNotes.pdf.
Boehm, G., et al., "Metabolic Differences Between AGA- and SGA-Infants of Very Low Birthweight II Relationship to Protein Intake," Acta Pædiatrica Scandinavica, Almqvist, Och Wiksell, Stockholm, SE, vol. 77, No. 5, Jan. 1, 1988, pp. 642-646.
Burger and Schumm, "Detection of a Minor contributor in a DNA Sample Mixture from Human Milk," International Congress Series 1288:547-549 (2006).
Burger et al., "Detection of a 1% to 2% Contributor in a DNA Sample Mixture From Human Milk," International Society for Forensic Genetics 21$^{st}$ Congress Conference Programme and Abstracts [online], Sep. 12-17, 2005 [retrieved on Mar. 26, 2007]. Retrieved from the Internet: http://www.ipatimup.pt/isfg2005/PROGRAMME.pdf; p. 75.
Carey et al., "Growth and phosphorus metabolism in premature infants fed human milk, fortified human milk, or special premature formula. Use of serum procollagen as a marker of growth," Am. J. Dis. Children 141(5):511-515 (1987).
Casey, "The nutritive and metabolic advantages of homologous milk," Proc. Nutr. Soc. 48:271-281 (1989).
Cowan et al., "Milk permeate as a dietary supplement for lactating dairy cows," Aus. J. Exp. Agric. 30(6):807-810 (1990).
Davies, D. P., "Adequacy of Expressed Breast Milk for Early Growth of Preterm Infants," Arch. Disease in Childhood. 1977. vol. 52, pp. 296-301.
Friis and Andersen, "Rate of inactivation of cytomegalovirus in raw banked milk during storage at—20° C. and pasteurisation," Br. Med. J. 285:1604-1605 (1982).
Fukushima et al., "Consumption of cow milk and egg by lactating women and the presence of β-lactoglobulin and ovalbumin in breast milk," Am. J. Clin. Nutr. 65:30-35 (1997).
Gartner et al., "Breastfeeding and the use of human milk," Pediatr. 115(2):496-506 (2005).
Geilman et al., "Production of an electrolyte beverage from milk permeate," J. Dairy Sci. 75(9):2364-2369 (1992).
Hagelberg S., et al., "Amino Acid Levels in the Critically Ill Preterm Infant Given Mother's Milk Fortified with Protein from Human or Cow's Milk" Acta Paediatr. Scand.1990. vol. 79, pp. 1163-1174.
Hagelberg, S., et al., "The Protein Tolerance of Very Low Birth Weight Infants Fed Human Milk Protein Enriched Mothers' Milk" Acta Paediatr. Scand. 1982. vol. 71, pp. 597-601.
Hartmann et al., "Best Practice Guidelines for the Operation of a Donor Human Milk Bank in an Australian NICU," Early Human Devel. 83:667-673 (2007).
Hylmö, P., et al., "Preparation of Fat and Protein from Banked Human Milk: Its Use in Feeding Very-Low-Birth-Weight Infants," Human Milk Banking, edited by A.F. Williams and J.D. Baum, Nestle Nutrition, Vewey/Raven Press, New York, 1984, pp. 55-61.
Itabashi et al., "Fortified preterm human milk for very low birth weight infants," Early Hum. Devel. 29:339-343 (1992).
Jenness and Palmer, "Substances Adsorbed on the Fat Globules in Cream and Their Relation to Churning. V. Composition of the

(56) References Cited

OTHER PUBLICATIONS

'Membrane' and Distribution of the Adsorbed Substances in Churning," J. Dairy Science 28(8):611-623 (1945).
Jensen et al., "Lipids in Human Milk and Infant Formulas," Ann. Rev. Nutr. 12:417-441 (1992).
Jensen et al., "Lipids of Bovine and Human Milks: A Comparison," J. Dairy Science 73:223-240 (1990).
Klein, Catherine J., "Nutrient Requirements for Preterm Infant Formulas," J. Nutr. 132:1395S-1577S, 2002.
Krukovsky et al., "The Effects of Nordihydroguaiaretic Acid, Salt, and Temperature of Storage on the Stability of Fat and Fat-Soluble Vitamins in Cream and Butter," J. Dairy Science 32(7):679-687 (1949).
Lawrence, "Storage of human milk and the influence of procedures on immunological components of human milk," Acta Pædiatr. 88:14-18 (1999).
Lindblad B.S., et al., "Blood Levels of Critical Amino Acids in Very Low Birthweight Infants on a High Human Milk Protein Intake" Acta Paediatr. Scand.1982.vol. 296, pp. 24-27.
Lönnerdal, "Biochemistry and physiological function of human milk proteins," Am. J. Clin. Nutr. 42:1299-1317(1985).
Lucas et al., "A human milk formula," Early Hum. Devel. 4/1:15-21 (1980).
Luck and Nau, "Nicotine and cotinine concentrations in the milk of smoking mothers: influence of cigarete consumption and diurnal variation," Eur J. Pediatr. 146:21-26 (1987).
McKiernan and Hull, "The Constituents of Neonatal Milk," Pediatr. Res. 16:60-64 (1982).
Moro et al., "Fortification of Human Milk: Evaluation of a Novel Fortification Scheme and of a New Fortifier," J. Ped. Gastroenterol. Nutr. 20:162-172 (1995).
Moro, G.E., et al., "Growth and Metabolic Responses in Low-Birth-Weight Infants Fed Human Milk Fortified with Human Milk Protein or with a Bovine Milk Protein Preparation," J. Pediatric Gastroenterol. and Nutr. 1991. vol. 13, pp. 150-154.
Ogundele,"Techniques for the storage of human breast milk: implications for anti-microbial functions and safety of stored milk," Eur. J. Pediatr. 159:793-797 (2000).
Panzer et al., "Immune thrombocytopenia in severe hemophilia A treated with high-dose intravenous immunoglobulin," Transfusion 26:69-72 (1986).
Polberger, S.K.T., "Fortified Human Milk for Very Low Birth Weight Infants: Effects on Growth and Metabolism," Dept. Pediatrics, University of Lund, Malmo 1990, pp. 1-148.
Polberger, S.K.T., et al., "Amino Acid Concentrations in Plasma and Urine in Very Low Birth Weight Infants Fed Non-Protein-Enriched or Human Milk Protein-Enriched Human Milk," Department of Pediatrics, University of Lund, Malmö General Hospital, S-21401 Malmö Sweden, pp. 131-148. Pediatrics 1990; 86: 909-915.
Polberger, S.K.T., et al., "Assessment of Eleven Different Plasma Proteins as Indicators of Protein Nutritional Status in Very Low Birth Weight Infants," Department of Pediatrics, University of Lund, Malmö General Hospital, S-21401 Malmö Sweden, 1990, pp. 115-129.
Polberger, S.K.T., et al., "Concentrations of Twelve Plasma Proteins at Birth in Very Low Birth Weight and in Term Infants," Department of Pediatrics, University of Lund, Malmö General Hospital, S-21401 Malmö Sweden, pp. 101-114. Acta Paediatr Scand. 1990; 79(8-9): 729-736.
Polberger, S.K.T., et al., "Growth of Very Low Birth Weight Infants on Varying Amounts of Human Milk Protein," Department of Pediatrics, University of Lund, Malmö General Hospital, S-21401 Malmö Sweden, pp. 69-87. Pediatr Res 1989; 25: 414-419.
Polberger, S.K.T., et al., "Urinary and Serum Urea as Indicators of Protein Metabolism in Very Low Birth Weight Infants Fed Varying Human Milk Protein Intakes," Department of Pediatrics, University of Lund, Malmö General Hospital, S-21401 Malmö Sweden, pp. 89-99. Acta Paediatr Scand. 1990; 79(8-9): 737-742.

Prentice, "Constituents of Human Milk," *Food and Nutrition Bulletin*, the United Nations University Press, 17(4), Dec. 1996. Retrieved from the internet: http://www.inffoundation.org/FNB/FNBIndexNEW.html.
Rönnholm, K., et al., "Supplementation with Human Milk Protein Improves Growth of Small Premature Infants Fed Human Milk," Pediatrics. 1986. vol. 77, No. 5, pp. 649-653.
Rönnholm, Kar., et al., "Human Milk Protein and Medium-Chain Triglyceride Oil Supplementation of Human Milk: Plasma Amino Acids in Very Low-Birth-Weight Infants," Pediatrics, American Academy of Pediatrics, Evanston, IL, vol. 74, No. 5, Jan. 1, 1984, pp. 792-799.
Saiki et al., "Genetic analysis of amplified DNA with immobilized sequence-specific oligonucleotide probes," Proc. Natl. Acad. Sci. USA 86:6230-6234 (1989).
Schanler et al., "Feeding strategies for premature infants: beneficial outcomes of feeding fortified human milk versus preterm formula," Pediatr. 103(6 Pt 1):1150-1157 (1999).
Schanler, R., et al., "Enhanced Fecal Excretion of Seleted Immune Factors in Very Low Birth Weight Infants Fed Fortified Human Milk," Pediatric Research. 1986. vol. 20, No. 8, pp. 711-715.
Schanler, R., et al., "Fortified mothers' milk for very low birth weight infants; results of growth and nutrient balance studies," J. Pediatrics. 1985. vol. 107, No. 3, pp. 437-444.
Schanler, R., et al., "Fortified mothers' milk for very low birth weight infants: results in macromineral balance studies," J. Pediatrics. 1985. vol. 107, No. 5, pp. 767-774.
Schanler, R., et al., "Mineral balance studies in very low birth weight infants fed human milk," J. Pediatrics. 1988. vol. 113, vol. 1, Part 2, pp. 230-238.
Srinivasan, L., et al., "Increased osmolality of breast milk with therapeutic additives," Arch. Dis. Child. Fetal. Neonatal Ed. 2004. 89:F514-F517.
Supplementary European Search Report dated Apr. 20, 2011 in co-pending European application No. EP 07811645.6, 7 pages.
Supplementary European Search Report dated Apr. 27, 2011 in co-pending European application No. EP 07864921.7, 8 pages.
Supplementary European Search Report dated Mar. 24, 2009 in co-pending European application No. EP 06815100.0, 6 pages.
Supplementary European Search Report dated Oct. 15, 2010 in co-pending European application No. EP 07865463.9, 6 pages.
Supplementary European Search Report dated Oct. 29, 2012 in co-pending European application No. EP 09831061.8, 5 pages.
Terpstra, et al., "Antimicrobial and Antiviral Effect of High-Temperature Short-Time (HTST) Pasteurization Applied to Human Milk," Breastfeeding Med. 2007. vol. 2, pp. 27-33.
The Dairy Council, "The Nutritional Composition of Dairy Products," pp. 1-49, 2002.
Tully, "Is Pasteurized Mother's Own or Donor Milk an Answer to the HIV Crisis," J. Hum. Lact. 15(4):345-346 (1999).
Virus Safety Services, Sanquin Research, Final Report FR4500, "Process Validation Breast Milk Step 1 for Inactivation of BVDV/HAV/HIV/PSR," May 27, 2002. pp. 1-33.
Voyer, M., et al. "Human Milk Lacto-Engineering," Acta Paediatr. Scand. 1984. vol. 73, pp. 302-306.
Williams et al., "Human Milk Banking," J. Trop. Pediatr. 31:185-190 (1985).
Young, "International Search Report," and "Written Opinion of the International Searching Authority," 11 pages, from International Patent Application No. PCT/US09/66430, United States Patent and Trademark Office, Alexandria, Virginia, USA (dated Jan. 26, 2010).
Young, "International Search Report," and "Written Opinion of the International Searching Authority," 6 pages, from International Patent Application No. PCT/US07/19234, United States Patent and Trademark Office, Alexandria, Virginia, USA (dated Jan. 18, 2008).
Young, "International Search Report," and "Written Opinion of the International Searching Authority," 8 pages, from International Patent Application No. PCT/US07/86973, United States Patent and Trademark Office, Alexandria, Virginia, USA (dated May 5, 2008).
Young, "International Search Report," and "Written Opinion of the International Searching Authority," 8 pages, from International Patent Application No. PCT/US07/85969, United States Patent and Trademark Office, Alexandria, Virginia, USA (dated May 8, 2008).

(56) References Cited

OTHER PUBLICATIONS

Young, "International Search Report," and "Written Opinion of the International Searching Authority," 8 pages, from International Patent Application No. PCT/US06/36827, United States Patent and Trademark Office, Alexandria, Virginia, USA (dated Sep. 5, 2007).

* cited by examiner

MICROFILTRATION OF HUMAN MILK TO REDUCE BACTERIAL CONTAMINATION

CROSS-REFERENCE TO RELATED APPLICATIONS

This application claims the benefit of U.S. Provisional Patent Application No. 61/514,673, filed Aug. 3, 2011, which is incorporated herein by reference in its entirety.

TECHNICAL FIELD

The present disclosure relates to human milk products. Specifically, the present disclosure relates to methods for producing human milk products with a lower bacterial content, including *Bacillus cereus*, when compared to raw human milk.

BACKGROUND

Human milk, and human milk-based products, are the preferred food for premature infants. Since the immune system of premature infants is relatively undeveloped, it is important that human milk-based products do not contain significant levels of bacteria, including *Bacillus cereus*. At the same time, it is important to minimize any alteration of the content of fat and protein in human milk, since these constituents are critical for the health and development of the premature infant.

The well known process of pasteurization has been used for many decades to kill bacteria in human milk. *Bacillus cereus* is an endospore forming bacteria and is often the predominant bacteria found in pasteurized human milk because it can survive the typical pasteurization process. Typical pasteurization processes (e.g., low or moderate temperatures for about 30 minutes) generally do not inactivate spore forming bacteria, such as *Bacillus cereus*. Unfortunately, the ultra-high temperatures and pressures needed in the pasteurization process to inactivate spore forming bacteria, such as *Bacillus cereus*, adversely affect the composition particularly the structure of fat and protein in human milk.

Various methods for producing non-human milk with a lowered bacterial count through the use of filtration are known in the art, however, none have found wide acceptance. The prior art methods generally suffer from either poor flow rates, rendering the method uneconomical on a large scale, or adversely affect the quality of the non-human milk, making the product unacceptable to the consumers.

Swedish patent publication No. 380,422 discloses a method in which non-human whole milk is divided into filtrate and concentrate fractions by microfiltration. The filtrate that passes through the pores of the filter (the size of the pores may range broadly from 0.1 micron-10 micron) consists of non-human milk with substantially reduced fat content and the concentrate, which is the fraction retained by the surface of the filter, consists of cream. Not only bacteria but also fat globules are substantially retained by the filter.

U.S. Pat. No. 5,064,674 relates to a method for making hypoallergenic non-human milk by ultrafiltration methods employing membranes that will allow molecules having a molecular weight of less than or equal to about 5 kDa to pass through. The excluded components that are trapped by the membrane include milk proteins, viable or non-viable bacteria, bacterial protein antigen, and milk fat. The filtrate collected from the ultrafiltration process therefore is free not only of bacteria and bacterial protein antigen, but also fat and milk protein, making the product unsuitable for use as non-human milk, per se.

Thus, the pores of filters used in the art to filter bacteria from milk compositions, while effective in sterilizing milk, will also remove fat and at least some of the proteins. Such a filter quickly becomes clogged by the trapped material; hence, the flow rate through the filter rapidly declines and the cost of such an inefficient process is generally prohibitive. Furthermore, because the filter retains fat and protein, the quality of the milk, is also adversely affected.

Thus, there is a need for an improved milk filtration processing method that can provide a sterile or more nearly sterile product while maintaining the nutritional content for human milk and human milk based products.

SUMMARY OF THE INVENTION

It has now been discovered that microfiltration of human milk can be successfully accomplished by employing porous particulate filter aids such as diatomaceous earth, without the prior art problems of degradation of human milk quality, premature filter plugging, and inadequate bacterial removal.

In accordance with the present invention human milk is separated into skim and cream portions to produce human skim milk with a fat content between about 1.0% and about 0.1%. Once the human milk is separated, a porous, particulate filter aid is added to the human skim milk. By performing the separation of human milk first, the amount and particle size of the fat globules of the milk is significantly reduced. Adding the filter aid allows for microfiltration of the human milk.

Human milk is an emulsion of fat and protein particles in water. Separating the human milk into cream and skim provides a method of removing a high percentage of large fat particles in the emulsion. Then, adding the filter aid, which effectively prevents compressible solids from forming an impermeable mass which would plug the filter, allows passage of the human milk through an appropriately sized microporous membrane, to retain bacteria, including *Bacillus cereus*, contained therein without unwanted removal of the protein content of the milk.

After separating the human milk into cream and skim, the filter aid is added to the skim human milk, to prevent compressible solids from forming an impermeable mass during a filtration process, which would plug the filter. The invention thus provides an improved method for producing human milk products with a lower bacterial content, including *Bacillus cereus*, without the need for high temperature pasteurization.

Thus, in one aspect, the present invention provides a method for treating raw human milk to produce treated human milk having a lower bacterial content, including *Bacillus cereus*, than raw human milk. The method comprises taking raw human milk with a potential bacterial content, for example, *Bacillus cereus*, and separating the raw human milk into cream and skim fractions, with the skim fraction containing between about 1.0% and about 0.1% fat. A filter aid is added to the skim fraction and then the milk is subjected to microfiltration by passing the milk through a series of microfilters having an average pore size sufficient to reduce the bacterial content of the milk flowing there through, to yield a filtrate which has a lower bacterial content than the initial raw human milk and a concentrate having a higher bacterial content than the initial raw human milk. The resulting skim human milk has a very low bacterial content, such as, on average, about $10^1$ bacteria per milliliter or less, with *Bacillus cereus* content, on average, of less than about $10^0$ (i.e., less than about 1) per milliliter. This product can further be processed, used and/or sold as skim human milk (see, e.g., FIG. 1.)

In another embodiment the present invention provides a method for treating raw human milk to produce treated human milk having a lower bacterial content, for example, *Bacillus cereus*, than raw human milk. The method comprises taking raw human milk with a potential bacterial content, for example, *Bacillus cereus*, and separating the raw human milk into cream and skim fractions, with the skim fraction containing between about 1.0% and about 0.1% fat. Filter aid is added to the skim fraction, and the mixture is subject to microfiltration by passing the milk through a series of microfilters having an average pore size sufficient to reduce the bacterial content of the milk flowing there through, to yield a filtrate which has a lower bacterial content than the initial raw human milk and a concentrate having a higher bacterial content than the initial raw human milk. The resulting skim human milk has a very low bacterial content, such as, on average, about $10^1$ bacteria per milliliter or less, with *Bacillus cereus* content on average of less than about $10^0$ (i.e., less than about 1) per milliliter. Then, a human milk cream fraction that is found to have a low level of *Bacillus cereus* can be mixed with the filtered skim human milk to create a whole human milk product with a very low bacterial content, including less than $10^0$ per milliliter of *Bacillus cereus*. This product can further be processed, used and/or sold as whole human milk. (see, e.g., FIGS. 2 and 3)

In another embodiment the present invention provides a method for treating raw human milk to produce treated human milk having a lower bacterial content, for example, *Bacillus cereus*, than that of raw human milk. The method comprises taking raw human milk with a potential bacterial content, for example, *Bacillus cereus*, and separating the raw human milk into cream and skim fractions, with the skim fraction containing between about 1.0% and about 0.1% fat. Filter aid is added to the skim fraction, and the mixture is subject to microfiltration by passing the milk through a series of microfilters having an average pore size sufficient to reduce the bacterial content of the milk flowing there through, to yield a filtrate which has a lower bacterial content than the initial raw human milk and a concentrate having a higher bacterial content than the initial raw human milk. The resulting skim human milk has a very low bacterial content, such as, on average, about $10^1$ bacteria per milliliter or less, with *Bacillus cereus* content on average of less than about $10^0$ (i.e., less than about 1) per milliliter. Next, the filtered skim human milk is concentrated via ultrafiltration as disclosed, for example in US Appl. Publ. 2008/0124430, incorporated by reference herein in its entirety, to a protein content between about 5% and about 15%. Then, a human milk cream fraction that is found to have a low level of *Bacillus cereus* can be mixed with the concentrated filtered skim human milk to create a human milk-based fortifier product with a very low bacteria content, including less than about $10^0$ (i.e., less than about 1) per milliliter of *Bacillus cereus*. This product can further be processed, used and/or sold as a human milk based fortifier (see, e.g., FIGS. 4 and 5)

DETAILED DESCRIPTION OF THE INVENTION

Figure 1:
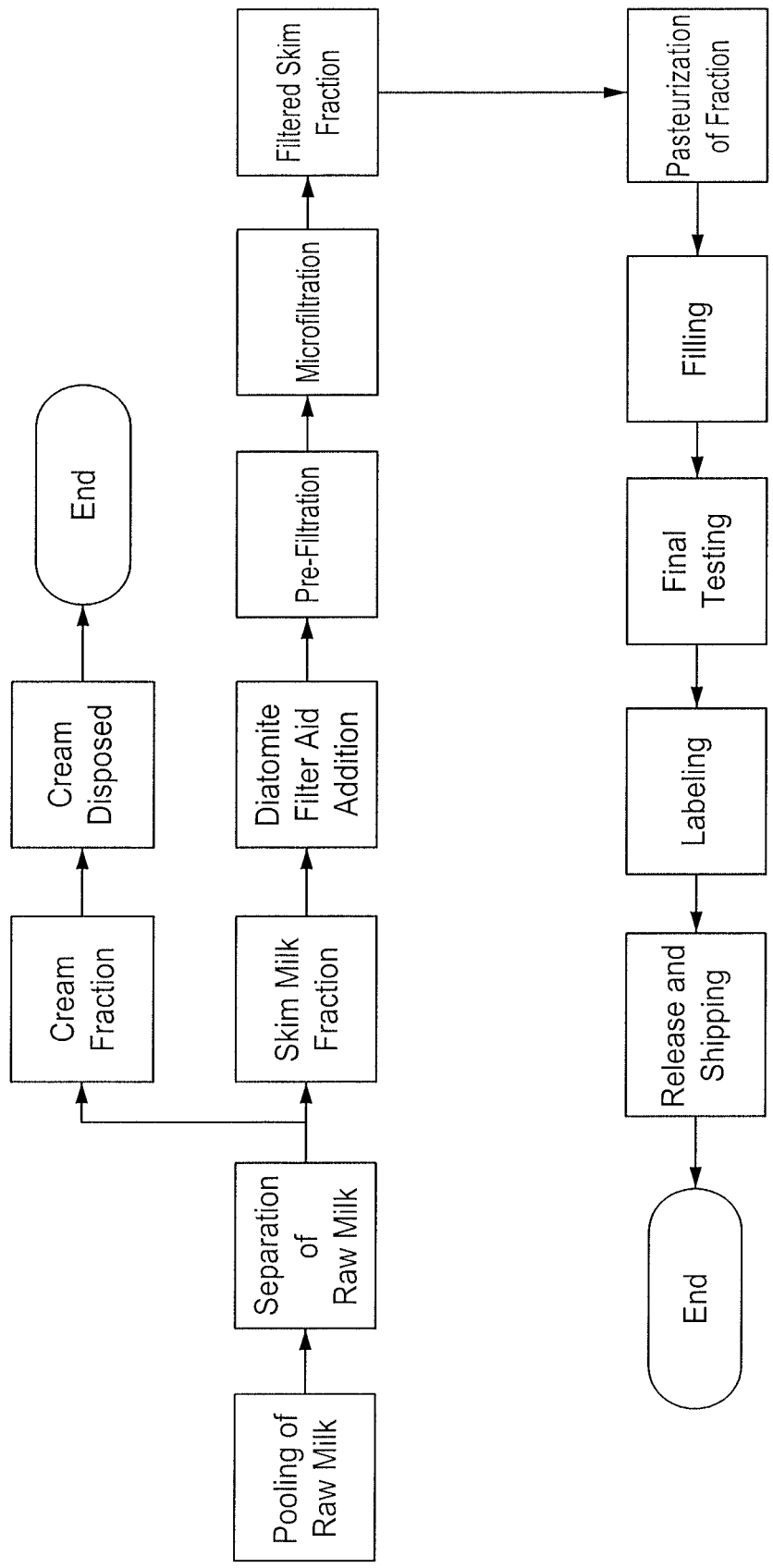
FIG. 1 depicts a representative process to make a filtered skim milk fraction from unfiltered skim according to the present invention.
Figure 2:
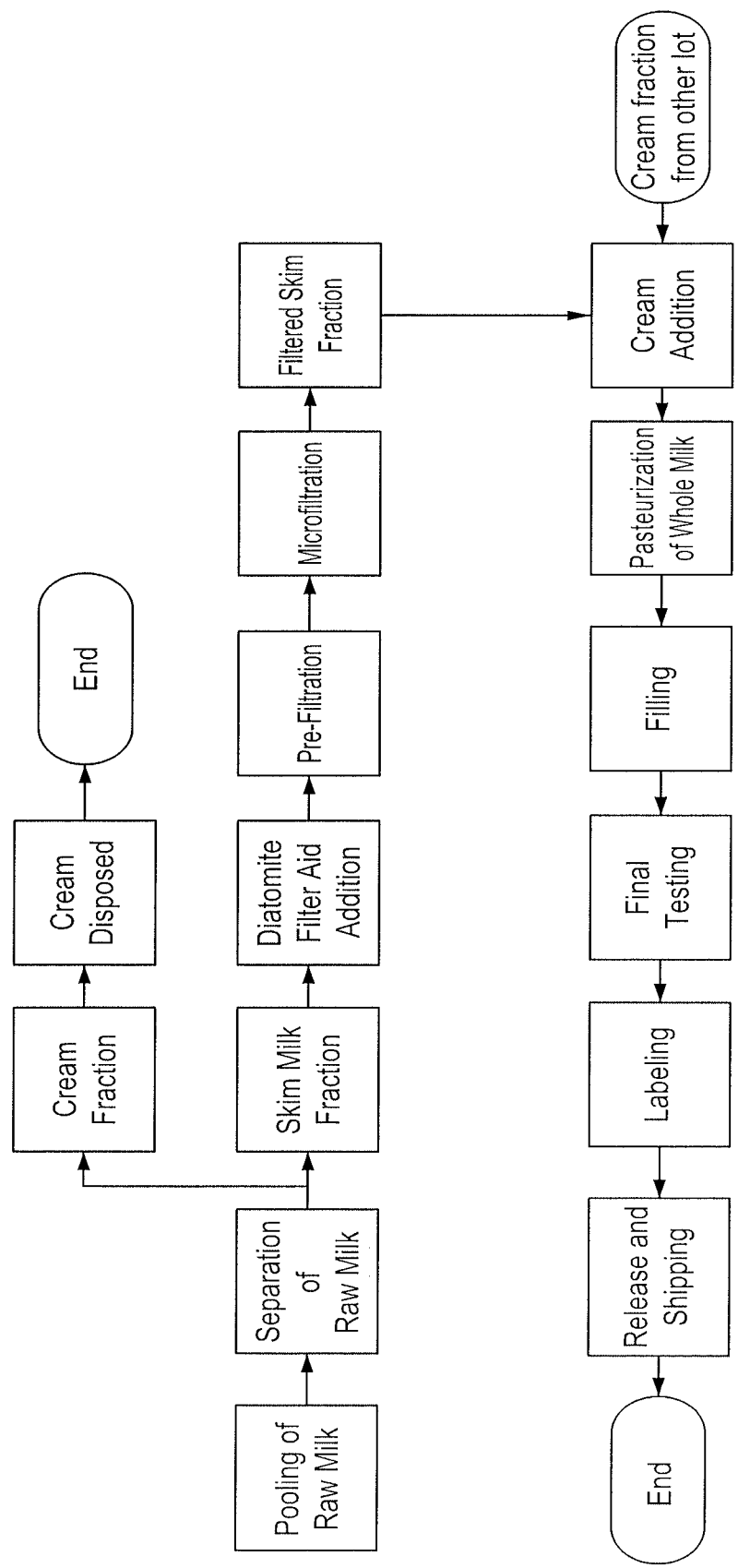
FIG. 2 depicts a representative process to make whole milk from a filtered skim milk fraction according to the present invention.
Figure 3:
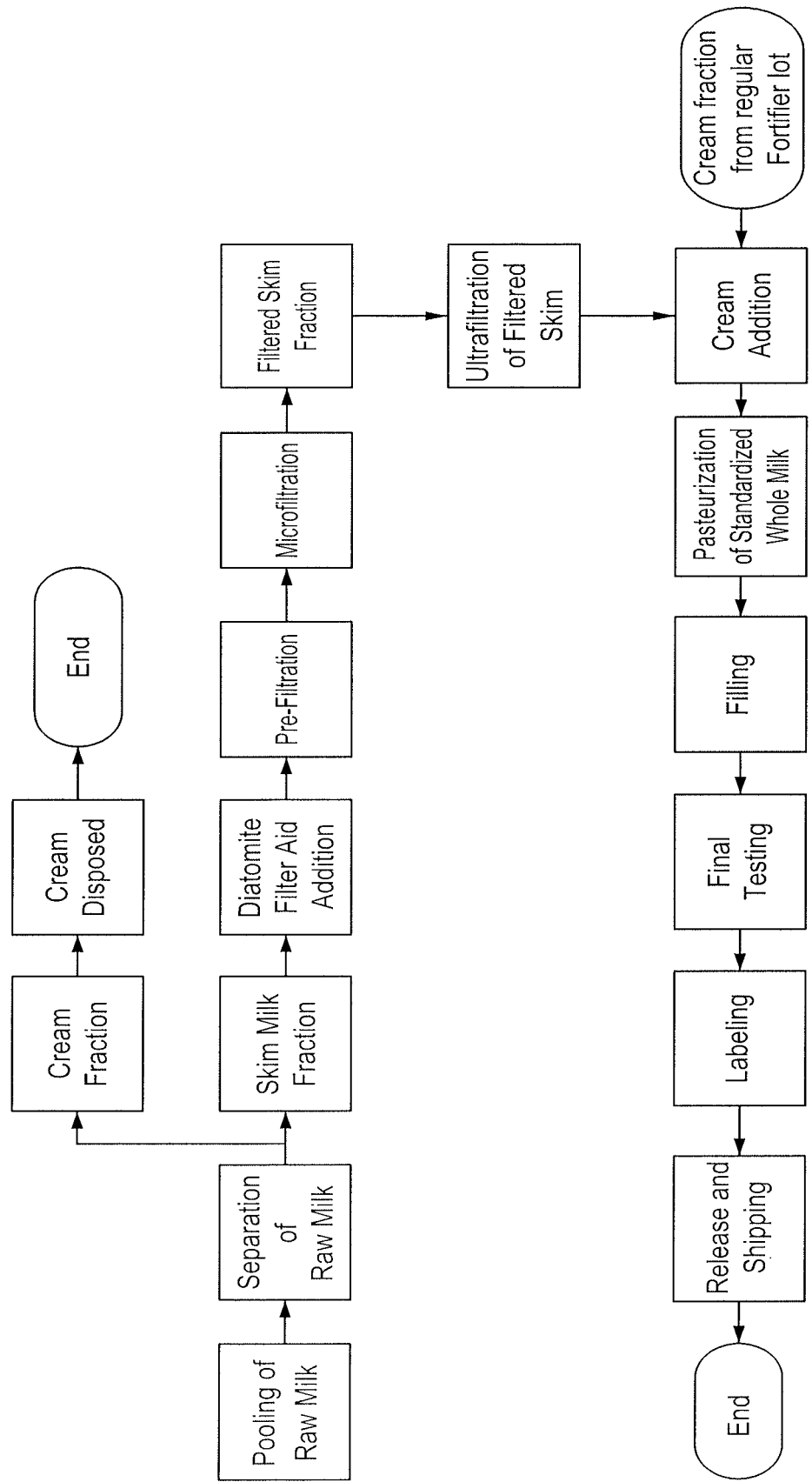
FIG. 3 depicts a representative process to make standardized whole milk from a filtered skim milk fraction according to the present invention.
Figure 4:
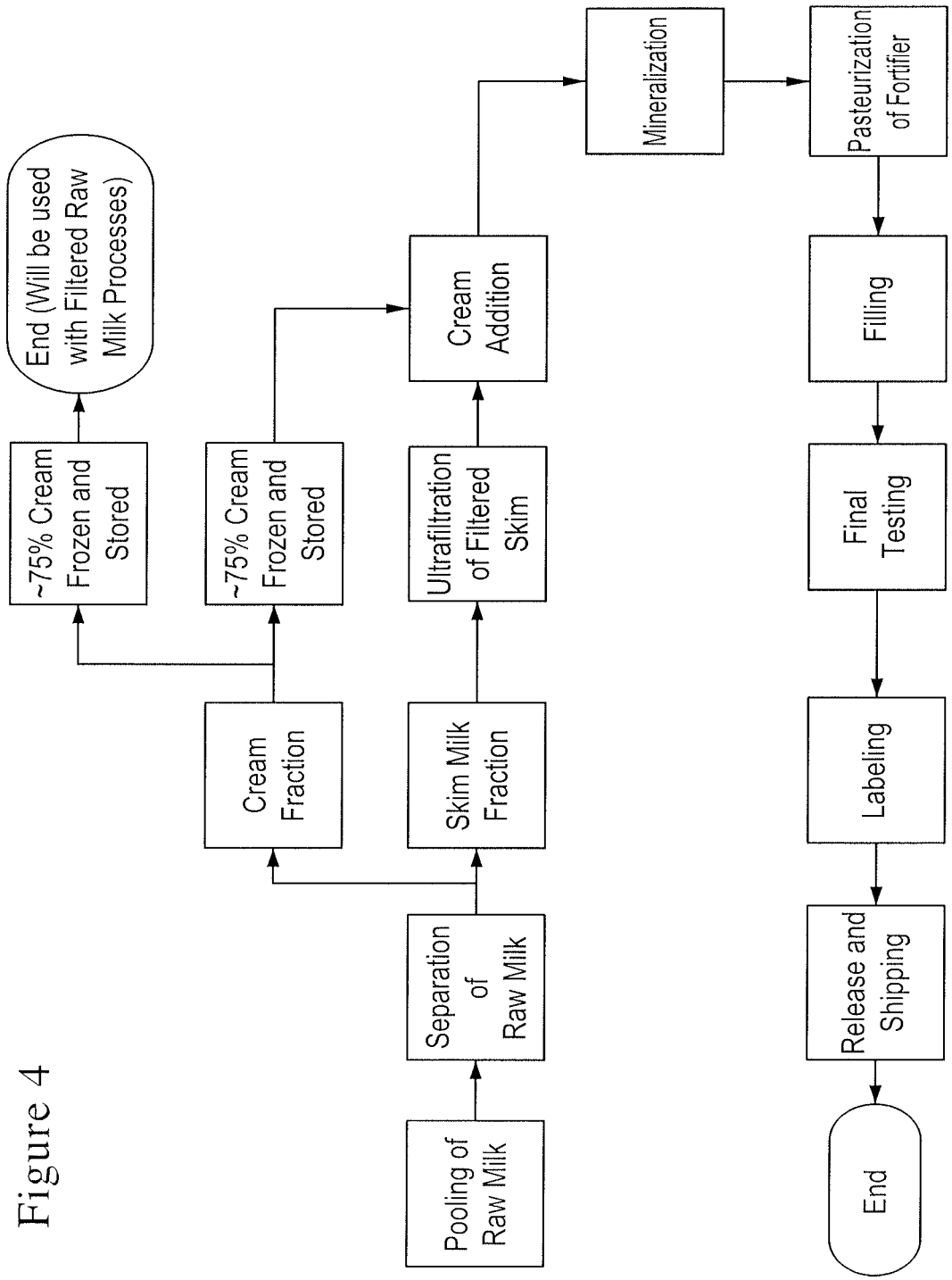
FIG. 4 depicts a representative process to make fortifier from normal skim according to the present invention.
Figure 5:
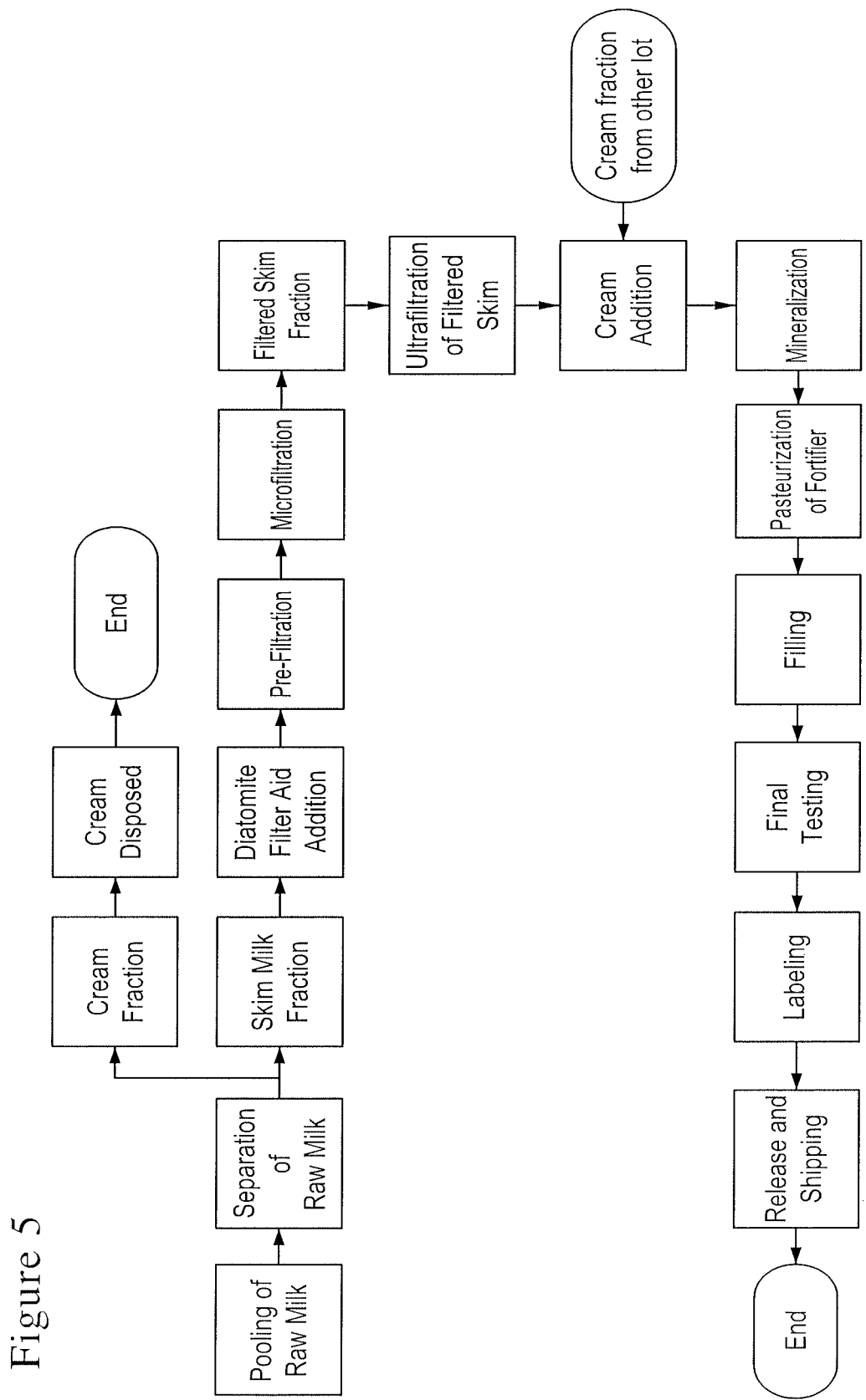
FIG. 5 depicts representative process to make fortifier from filtered skim milk fraction according to the present invention.

All publications, patents and patent applications, including any drawings and appendices herein are incorporated by reference to the same extent as if each individual publication or patent application was specifically and individually indicated to be incorporated by reference.

As used herein and in the appended claims, the singular forms "a," "an," and "the" include plural referents unless the context clearly dictates otherwise. Thus, for example, reference to "a sample" includes a plurality of such samples and reference to "the protein" includes reference to one or more proteins known to those skilled in the art, and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Compressible solids, as described herein, may include fats, proteins and/or other nutrients typically found in human milk. Compressible solids may also comprise bacteria, bacterial fragments, spores, other microorganisms (e.g., yeast, etc.) and/or sloughed skin and/or skin cells (e.g., from a woman producing milk).

Unless otherwise specified, all references to "milk" herein refer to human milk.

Human milk has long been recognized as the ideal food for preterm and term infants because of its nutritional composition and immunologic benefits. Human milk is the most desirable source of such nutritional and immunological benefits. However, nutritional value of donor milk varies and there is concern about bacterial, viral and other contamination of donor milk. For infants, but particularly for premature infants, the ideal nutritional situation comprises the birth mother's milk. Alternatively, or additionally, the mother may express milk using a breast pump and store it for later use. Although there are few contraindications for breastfeeding, some contraindications include infants having galactosemia, and where mothers have active tuberculosis, are HTLV I or II positive, are being administered radioisotopes, antimetabolites, or chemotherapy, or are subjects of drug abuse. With respect to HIV infection, the situation is more complicated and the balance of risk to benefit has to be professionally evaluated.

Despite the well-documented positive effects of breastfeeding, the present in-hospital initiation rate in the United States is only 64 percent and the duration rate, at 6 months postpartum, is about 29 percent. Alternatives to breastfeeding are the use of human donor milk, formula as supplementary feeding to human milk, and formula alone. Fortification of expressed milk is indicated for many very low birth weight infants.

The Academy of Pediatrics Policy Statement suggests that banked human milk may be a suitable feeding alternative for infants whose mothers are unable or unwilling (e.g., for social reasons) to provide their own milk.

Preterm infants are commonly fed either a commercial infant formula designed specifically for these infants or their own mother's milk. Research is still underway regarding the nutritional requirements of these infants. However, numerous studies have documented that unsupplemented preterm milk and banked term milk provide inadequate quantities of several nutrients to meet the needs of these infants (Davies, D. P., "Adequacy of expressed breast milk for early growth of preterm infants," ARCHIVES OF DISEASE IN CHILDHOOD, 52, p. 296-301, 1997). Estimated energy requirements of growing low birth weight infants are approximately 120 Cal/kg/day, although the exact energy needs of any individual infant can vary because of differences in activity, basal energy expenditure, the efficiency of nutrient absorption, illness and the ability to utilize energy for tissue synthesis. About 50% of the energy intake is expended for basal metabolic needs, activity and maintenance of body temperature. About 12.5% is used to synthesize new tissue, and 25% is stored. The remaining 12.5% is excreted. Preterm human milk is often lacking in particular nutritional aspects. For example, preterm human milk often lacks calcium, phosphorus and protein. Thus, it has been recommended that when preterm infants are fed preterm human milk, the human milk be fortified to better meet the nutritional needs of the preterm infant.

Similac Natural Care® and Enfamil® Human Milk Fortifier are commercially available human milk fortifiers. The fortifiers differ with respect to their form, source of ingredients and energy and nutrient composition. In addition, these products are artificial in nature. There is need in the neonatal intensive care unit (NICU) for both liquid and powdered human milk fortifiers. Ideally, the best fortifier is of human origin such as those described in US Patent Application 2008/0124430 and PCT Application WO 2008/027572, which are both incorporated by reference herein in their entireties.

The secretion of fluid from the human female mammary gland includes a number of constituents referred to hereinafter simply as milk. Expressed milk is not typically sterile and contains bacteria even when obtained under aseptic conditions. Milk also is very quickly contaminated by microorganisms from the environment (air, expression devices, contact with hands or other non-sterile objects, a milk tank or receptacle, and the like) and specific pathogens such as B. cereus propagate rapidly even in pasteurized milk.

Milk is an excellent growth medium for numerous bacteria, and they can increase rapidly in numbers unless the milk is properly processed. Bacterial growth can spoil the milk or even pose a serious health hazard if pathogenic bacteria are present. Diseases that can be transmitted through milk include, but are not limited to, tuberculosis (*Mycobacterium tuberculosis*), undulant fever (*Brucella abortus*), Typhoid fever and Q fever (*Coxiella burnetii*). The contamination may come from a milk donor, from the person who handled the milk, from the environment, or from the containers. Other microorganisms that can be found in contaminated milk include, but are not limited to, *Staphylococcus* spp. (e.g., *Staphylococcus aureus*, Group A beta-hemolytic *Staphylococcus pyogenes*), *Streptococcus* spp. (e.g., *Streptococcus pneumoniae*), *Shigella* spp. (e.g., *Shigella sonnei*, *Shigella flexneri*, *Shigella boydii* and *Shigella dysenteriae*), classic enteropathogenic *E. coli* A, B and C, enteroinvasive *E. coli* A and B, *Bacillus* spp. (e.g., *Bacillus cereus*, *Bacillus coryneform*), *Pseudomonas* spp. (e.g., *Pseudomonas aeruginosa*), *Micrococcus* spp., *Streptococcus* spp. (e.g., alpha-gamma hemolytic *Streptococcus* spp.), *Klebsiella* spp. (e.g., *Klebsiella pneumoniae* and *Klebsiella oxytoca*), *Enterobacter* spp. (e.g., *Enterobacter cloacae*, *Enterobacter aerogenes*), *Proteus* spp. (e.g., *Proteus mirabilis*), *Citrobacter* spp. (e.g., *Citrobacter freundii*), *Serratia* spp., *Neisseria* spp., *Candida* spp., *Enterococcus* spp. (e.g., Group D *Enterococcus*), *Haemophilus* spp., *Chromobacterium* spp. (e.g, *Chromobacterium violaceum*), *Cedecea* spp., *Stenotrophomonas* spp. (e.g., *Stenotrophomonas maltophilia*), *Salmonella* spp., Mesophiles bacteria, Thermodurics bacteria, and Psychrotrophic bacteria. More details of bacterial contamination of milk are discussed in Cairo et al. (Braz J Infect Dis vol. 12 no. 3 Salvador June 2008), Ruediger (The Journal of Infectious Diseases Vol. 19, No. 4, October, 1916), Surjono et al. (Journal of Tropical Pediatrics, 26(2): 58-61, 1980), Pirraed W B et al. (Am J Perinatol. 1991 January; 8(1):25-7), and Burrow (Public Health June 1931 vol. 52 no. 6 234-252).

*Bacillus* is a genus of Gram-positive rod-shaped bacteria and a member of the division Firmicutes. *Bacillus* species can be obligate aerobes or facultative anaerobes, and test positive for the enzyme catalase. Ubiquitous in nature, *Bacillus* includes both free-living and pathogenic species. Under stressful environmental conditions, *Bacillus* cells produce oval endospores that can stay dormant for extended periods. Two *Bacillus* species are considered medically significant: *B. anthracis*, which causes anthrax, and *B. cereus*, which causes a foodborne illness similar to that of *Staphylococcus*. A third species, *B. thuringiensis*, is an important insect pathogen, and is sometimes used to control insect pests. *B. subtilis* is a notable food spoiler, causing ropiness in bread and related food. *B. coagulans* also causes food spoilage. Non-limiting examples of *Bacillus* include, *B. alcalophilus*, *B. alvei*, *B. aminovorans*, *B. amyloliquefaciens*, *B. aneurinolyticus*, *B. anthracis*, *B. aquaemaris*, *B. brevis*, *B. caldolyticus*, *B. centrosporus*, *B. cereus*, *B. circulans*, *B. coagulans*, *B. firmus*, *B. flavothermus*, *B. fusiformis*, *B. globigii*, *B. infernus*, *B. larvae*, *B. laterosporus*, *B. lentus*, *B. licheniformis*, *B. megaterium*, *B. mesentericus*, *B. mucilaginosus*, *B. mycoides*, *B. natto*, *B. pantothenticus*, *B. polymyxa*, *B. pseudoanthracis*, *B. pumilus*, *B. schlegelii*, *B. sphaericus*, *B. sporothermodurans*, *B. stearothermophilus*, *B. subtilis*, *B. thermoglucosidasius*, *B. thuringiensis*, *B. vulgatis*, and *B. weihenstephanensis*.

*Bacillus cereus* is an endemic, soil-dwelling, Gram-positive, rod-shaped, endospore forming, facultative aerobic, and beta hemolytic bacterium. *B. cereus* is mesophilic, growing optimally at temperatures between 20° C. and 40° C., and is capable of adapting to a wide range of environmental conditions. It is distributed widely in nature and is commonly found in the soil as a saprophytic organism. Some strains are harmful to humans and cause foodborne illness, while other strains can be beneficial as probiotics for animals (Ryan K J; Ray C G (editors) (2004). *Sherris Medical Microbiology* (4th ed.). McGraw Hill). It is the cause of "Fried Rice Syndrome".

*B. cereus* bacteria are aerobes, and like other members of the genus *Bacillus* can produce protective endospores and are therefore not susceptible to routine pasteurization techniques. *B. cereus* is responsible for a minority of foodborne illnesses (2-5%), causing severe nausea, vomiting and diarrhea. *Bacillus* foodborne illnesses occur due to survival of the bacterial endospores when food is improperly cooked. Cooking temperatures less than or equal to 100° C. (212° F.) allows some *B. cereus* spores to survive. This problem is compounded when food is then improperly refrigerated, allowing the endospores to germinate. Cooked foods not meant for either immediate consumption or rapid cooling and refrigeration should be kept at temperatures above 60° C. (140° F.). Germination and growth generally occurs between 10-50° C. (50-122° F.). Bacterial growth results in production of enterotoxins, one of which is highly resistant to heat and to pH between 2 and 11; ingestion leads to two types of illness, diarrheal and emetic (vomiting) syndrome.

*B. cereus* infections are particularly dangerous to neonatal infants and lead to a particularly high mortality rate in infected infants (Hilliard, et al. (2003) J. Clin. Microbiol., 41(7):3441-3444 and Lequin, et al. (2005) Am. J. Neuroradiol., 26:2137-2143). As mentioned above, *B. cereus* is a pathogenic sporeformer which are not inactivated by pasteurization as is the case for most other bacteria found in human milk. While there are no government guidelines for acceptable levels of *B. cereus* in nutritional products fed to neonatal infants, out of an abundance of caution due to the high mortality rate associated with *B. cereus* infections in neonatal infants, we have set a limit of less than 1 CFU/ml for our final human milk product.

The terms "premature", "preterm" and "low-birth-weight (LBW)" infants are used interchangeably and refer to infants born less than 37 weeks gestational age and/or with birth weights less than 2500 gm. The needs of the premature infant are particularly acute. For very low-birth-weight infants (<1500 g), mortality before the age of 1 year is 25%. For low-birth-weight babies (<2500 g), the 1-year mortality is 2 percent; still considerably higher than the figure of 0.25 percent for normal-birth-weight infants (>2500 g).

In one aspect, the disclosure provides methods for obtaining and processing human milk from a donor or collection of donors. The methods of the disclosure including processes that reduce the bacterial content while maintaining nutritional value in a fortified preparation. Generally the methods include measures to identify and qualify suitable donors. Individuals are typically recommended as a donor by their personal physician. Amongst other reasons, this helps to ensure that donors are not chronically ill. Methods and systems for qualifying and monitoring milk collection and distribution are described in U.S. Patent Application 2010/0268658.

A screening process by interview as well as biological sample processing is performed. A biological sample is screened for viral (e.g., HIV 1 and 2, HTLV I and II, HBV, and HCV) and syphilis, as well as other prokaryotic pathogens (e.g., *B. cereus*) and donations testing positive are discarded.

Any potential sample found positive on screening removes the sample from processing and the donor from further donations. Yet another measure taken comprises testing a donor sample or pool of milk for drugs of abuse.

Donors may be periodically requalified. For example, a donor may be required to undergo screening by the same protocol as used in their initial qualification every four months. A donor who does not requalify or fails qualification is deferred until such time as they do properly requalify. In some instances the donor is permanently deferred if warranted by the results of requalification screening. In the event of the latter situation, all remaining milk provided by that donor is removed from inventory and destroyed. A qualified donor may donate at a designated facility (e.g. in a milk bank office) or, typically, expresses milk at home. In one aspect, the qualified donor is provided with the supplies needed for collecting, saving and shipping the expressed milk by a milk bank or directly from a milk processor (the milk bank and processor may be the same or different entities) to take home. The supplies will typically comprise a computer readable code (e.g., a barcode-label) on containers and may further include a breast pump. The donor can then pump and freeze the milk at home, preferably at a temperature of −20° C. In one aspect, the donor milk is accepted provided that the blood test results are satisfactory 10-14 days after the last visit to the donor milk center; if such results are satisfactory, an appointment is made for the donor to drop off the milk at the center or have it collected from home. The milk and container are examined for their condition and the barcode information checked against the database. If satisfactory, the units are placed in the donor milk center or processing center freezer (−20° C.) until ready for further testing and processing.

In another aspect, the milk is expressed by the donor at her home and then collected at the milk banking facility, wherein this process involves the sampling of each donor's milk for markers to guarantee that the milk is truly from the registered donor. This is required to ensure that the milk is from the donor indicated on the milk sample sent to the processor and not collected in-person. Such subject identification techniques are known in the art (see, e.g., PCT Application WO 2007/035870, which is generally incorporated by reference elsewhere but which is specifically incorporated herein by reference). The milk may be stored (e.g., at −20° C.) and quarantined until the test results are received. Throughout the above process, any non-complying milk specimens are discarded. As is the case with blood donation centers, access to all confidential information about the donor, including blood test data, is tightly controlled. Collected, approved (e.g. passed risk factor testing) milk is then filtered by the methods of the current invention.

By "raw milk" is meant milk expressed from a mother which has not been treated.

By "whole milk" is meant milk from which no fat has been removed.

By "skim" or "skim milk" is meant whole milk less all or part of the fat content. It therefore may be appreciated that "skim milk" includes such variants as "low fat milk" wherein less than substantially all of the fat content has been removed.

By "cream" or "fat portion" is meant the portion of whole milk separated from the skim milk. Typically the cream comprises long chain, medium chain and short chain fatty acids at a concentration higher than that of skim milk obtained from the same preparation.

In one aspect of the current invention, the whole human milk is separated into skim and cream (i.e. fat). The milk is defatted to skim milk by conventional methods such as centrifugation. In one aspect, the pooled milk is pumped into a centrifuge to separate the fat (cream) from the rest of the milk which the skim milk is transferred to a processing tank where it remains at 2-8° C. until the filtration step(s). After centrifugation, the cream flows into a small stainless steel container. In one aspect, the cream is pasteurized followed by quantification of caloric, protein and fat content. In another aspect, after separation is completed, the volume, protein, and fat content of the cream is determined and a portion of the cream is added back to the skim milk to achieve the caloric, protein and fat content for the specific product being made. Minerals can be added to the milk prior to or after the filtration step.

Although not necessary it will be recognized that the human milk compositions of the disclosure can be modified or supplemented with non-naturally occurring or heterologous/heterogeneous constituents. For example, the protein content can be adjusted or modified using nitrogen source suitable for human consumption. Such proteins are well known by those skilled in the art and can be readily selected when preparing such composition. Examples of suitable protein constituents that can be added include casein, whey, condensed skim milk, nonfat milk, soy, pea, rice, corn, hydrolyzed protein, free amino acids, protein sources which contain calcium in a colloidal suspension with the protein and mixtures thereof.

Another constituent of the milk compositions of the disclosure comprise a source of fat. Fat is generally a source of energy for Low Birth Weight (LBW) infants, not only because of its high caloric density but also because of its low osmotic activity in solution. Again, although not necessary, the milk compositions of the disclosure can be supplemented with fat constituents. Such heterologous/heterogeneous fat constituents include high oleic safflower oil, soy oil, fractionated coconut oil (medium chain triglycerides, MCT oil), high oleic sunflower oil, corn oil, canola oil, coconut, palm and palm kernel oils, marine oil, cottonseed oil and specific fatty acids such as docosahexaenoic acid (DHA) and arachidonic acid.

Docosahexaenoic acid (DHA) is an omega-3 fatty acid. DHA is the most abundant 20 carbon omega-3 PUFA in human milk. However, human milk DHA content will vary greatly depending on the diet of the mother. If the mother eats fish high in DHA often, her milk will contain higher DHA levels, while a mom with less access to fish will have lower DHA levels in her milk. Consequently, human milk may require DHA supplementation to insure that the preterm infant is receiving sufficient amounts of DHA. DHA supplementation is typically accompanied by arachidonic acid supplementation. U.S. Pat. No. 5,492,938 to Kyle et al. describes a method of obtaining DHA from dinoflagellates and its use in pharmaceutical composition and dietary supplements.

Carbohydrates are another constituent of the compositions of the disclosure.

Carbohydrates provide a readily available source of energy that assists in growth and that reduces the risk of tissue catabolism that results in malnourished rapidly developing infants. In human milk and most standard milk-based infant formulas, the major carbohydrate is lactose. LBW infants may be unable to fully digest lactose because lactase activity in the fetal intestine is not fully developed until late in gestation (36 to 40 weeks). On the other hand, sucrase activity is maximal by 32 weeks gestation, and glucosoamylase activity, which digests corn syrup solids (glucose polymers), increase twice as rapidly as lactase activity during the third trimester. The human milk compositions of the disclosure can be supplemented with carbohydrates. Examples of carbohydrates that can be used to supplement the human milk compositions of the disclosure include, but are not limited to, hydrolyzed corn starch, maltodextrin, glucose polymers, sucrose, corn syrup, corn syrup solids, rice syrup, glucose, fructose, lactose, high fructose corn syrup and indigestible oligosaccharides such as fructooligosaccharides (FOS).

Vitamins and minerals are important to proper nutrition and development of an infant. A premature infant or LBW infant requires electrolytes such as sodium, potassium and chloride for growth and for acid-base balance. Sufficient intakes of these electrolytes are also needed for replacement of losses in the urine and stool and from the skin. Calcium, phosphorus and magnesium are needed for proper bone mineralization. For bones to grow, adequate amounts of these minerals must be present in a feeding.

Trace minerals are associated with cell division, immune function and growth. Consequently, provision of sufficient amounts of trace minerals are needed for infant growth and development. Trace minerals that are important include copper, magnesium and iron (which is important for the synthesis of hemoglobin, myoglobin and iron-containing enzymes). Zinc is needed for growth, for the activity of numerous enzymes, and for DNA, RNA and protein synthesis. Copper is necessary for the activity of several important enzymes. Manganese is needed for the development of bone and cartilage and is important in the synthesis of polysaccharides and glyoproteins. Accordingly, the human milk and fortifier compositions of the disclosure can be supplemented with vitamins and minerals.

Vitamin A is a fat-soluble vitamin essential for growth, cell differentiation, vision and the immune system. Vitamin D is important for absorption of calcium and to a lesser extent, phosphorus, and for the development of bone. Vitamin E (tocopherol) prevents peroxidation of polyunsaturated fatty acids in the cell, thus preventing tissue damage. Folic acid is important in amino acid and nucleotide metabolism. Serum folate concentrations have been shown to fall below normal after 2 weeks of age in LBW infants with low folic acid intakes. Additionally, several B vitamins are present at low concentrations in preterm milk.

As described above, the variability of human milk vitamin and mineral concentrations and the increased needs of the preterm infant requires a minimal fortification to insure that a developing infant is receiving adequate amounts of vitamins and minerals. Examples of supplemental vitamins and minerals in the human milk composition and fortifier of the disclosure include vitamin A, vitamin B1, vitamin B2, vitamin B6, vitamin B12, vitamin C, vitamin D, vitamin E, vitamin K, biotin, folic acid, pantothenic acid, niacin, m-inositol, calcium, phosphorus, magnesium, zinc, manganese, copper, sodium, potassium, chloride, iron and selenium. The additional nutrients chromium, molybdenum, iodine, taurine, carnitine and choline may also require supplementation.

Provided are sterile compositions free or substantially free of bacterial contamination, including but not limited to being free or substantially free of *B. cereus*, including a 67 Kcal/dL (20 calorie per ounce) whole milk product, an 80 Kcal/dL (24 calorie per ounce) whole milk product, and a human milk fortifier. Depending on the particular context, a composition of the present invention is considered to be substantially free of bacteria, or substantially free of a specific genus, species (e.g., *B. cereus*) or strain of bacteria, when the number of colony forming units per milliliter (CFU/ml) is $\leq 1$, or $\leq 1$, or $\leq 2$, or $\leq 3$, or $\leq 4$, or $\leq 5$, or $\leq 10$, or $\leq 20$, or $\leq 30$, or $\leq 40$, $\leq 50$ or $\leq 100$. The milk fortifier compositions comprise from about 20-70 mg/ml of protein, about 35-85 mg/ml of fat, about 70-115 mg/ml of carbohydrates and contains human IgA. Various caloric compositions can be obtained using the methods of the disclosure. Exemplary compositions are a 24 calorie milk composition and a fortifier milk composition.

An exemplary whole milk composition comprises the following constituents: human milk, calcium glycerophosphate, potassium citrate, calcium gluconate, calcium carbonate, magnesium phosphate, sodium chloride, sodium citrate, zinc sulfate, cupric sulfate, and manganese sulfate.

The fortifier composition comprises the following constituents: human milk, calcium carbonate, potassium phosphate, calcium phosphate, calcium glycerophosphate, calcium gluconate, sodium citrate, magnesium chloride, calcium chloride, magnesium phosphate, zinc sulphate, cupric sulfate, and manganese sulfate. In some embodiments the fortifier also contains approximately 35-85 mg/ml of human protein, approximately 60-110 mg/ml of fat, and approximately 60-140 mg/ml of carbohydrates. In one embodiment, the fortifier contains approximately 90 mg/ml of fat, approximately 60-90 mg/ml of carbohydrates and approximately 60 mg/ml of human protein.

The osmolarity of the human milk compositions and the fortifier of the disclosure are important to adsorption, absorption and digestion of the compositions. Improper osmolarity can result in abdominal distention and vomiting by the infant. The osmolarity of the human milk composition and fortifier (once mixed with milk) of the disclosure is typically less than about 400 mOsm/Kg H2O. Typically the osmolarity is from about 310 mOsm/Kg of water to about 380 mOsm/Kg of water. Where a composition of the disclosure is supplemented with a carbohydrate or fat constituent, the osmolarity of the compositions should be adjusted. For example, the type of constituent (e.g., carbohydrate or fat) impacts the osmolarity of the fortified human milk. The more hydrolyzed the carbohydrate the higher the osmotic activity. Additionally, partially hydrolyzed carbohydrate sources may further increase the osmolarity when reconstituted with human milk due to further hydrolysis by human milk amylase. One skilled in the art can readily select the carbohydrate or combination of carbohydrates that will result in the desired osmolarity of the reconstituted fortifier/human milk composition.

The fortifier is typically mixed with human milk to add 4 cal/ounce. Typically this is an 80:20 mixture of raw milk: fortifier (e.g., 8 ml of milk and 2 ml of fortifier). Other typical mixtures include 70:30; 60:40; and 50:50, although any and all relative proportions or amounts of milk to fortifier are contemplated by the present invention.

The fortifier typically comes in syringes or bottles. A bottle may be included with the syringes. In either case of the syringe kit (e.g., syringe and bottle) or the bottles can comprise graduated markers (i.e., indicators, lines, etc.) to assist in proper dilution. For example, a mother's milk can be tested to determine the milk's nutritional value. Typical milk comprises, on average, 1.1% protein, 4.2% fat, 7.0% lactose (a sugar), and supplies 70 kcal of energy per 100 grams. A mother's milk may be tested for nutritional value and then adjusted using a fortifier composition of the disclosure to add 4 cal/ounce to the mother's raw milk.

"A unit dose" refers to individual packages of fortifier containing an amount of fortifier that will be used in a preparation of milk for the infant. The amount of fortified human milk prepared for a premature infant typically ranges from 25 ml to 150 ml a day. Consequently, a single unit dose is the appropriate amount of fortifier to fortify an 8 to 40 ml preparation of milk. Additional unit dosages can be added for larger volumes. Thus, a unit dose is 2 ml fortifier per 8 ml of raw milk or 10 ml of fortifier per 40 ml of milk. In one aspect, the unit dose comprises a 10 ml syringe and may comprise 2 ml graduated markings sufficient to prepare multiple milk preparations.

Typically, the amount of human milk prepared is based on the amount of milk needed to provide an infant with a 24-hour nutritional supply. For example, a 1500 gm infant would be fed 150 ml of milk a day. If frozen milk is used, the frozen milk is placed in a warm water bath until completely thawed. Special attention is given to mixing in the fortifiers. Gentle mixing is required to avoid breaking the milk fat globule, which can increase the adherence of the milk fat to the sides of feeding containers and result in significant loss of fat (energy). The prescribed amount of fortified milk is drawn up into syringes and labeled with identification. When milk preparation is complete, the labeled, aliquoted feedings are delivered to the nurseries and placed into refrigerators for easy access by the nursing staff. Typically, the refrigerated fortified milk is warmed prior to feeding. For example, the fortified milk is warmed in a dry heat laboratory incubator set within a range of about 35-45° C. for about 15 minutes. This brings the temperature of the fortified milk to room temperature. The fortified milk may be administered to the infant as a bolus feeding or through a syringe infusion pump for continuous feeding. If an infusion pump is used, the syringe tip is positioned upright to allow for a continuous infusion of fat and the syringe is attached directly to the feeding tube to decrease the potential surface area that the fat and immunologic components may adhere to.

The disclosure provides a human milk and fortifier composition that is not xenogeneic and provides human proteins that have been demonstrated to promote immunological development and infant growth. Further, the human milk and fortifier compositions of the disclosure are well tolerated and maximizes the health benefits of human milk while addressing the variability of human milk as a source of energy, protein, calcium, phosphorus, sodium and other micronutrients.

Individual unit dose size packages are typically used over bulk packaging. Because of the small volumes of milk administered to premature infants over the course of a days feeding, small volumes of fortified human milk are prepared. Sterility in a bulk container that has been repeatedly opened, aliquoted, and stored is always a concern in a hospital environment. Individual unit doses allow for addition of small amounts of fortifier to human milk without the possibility of contamination of the remaining fortifier.

Numerous types of containers are readily available and known to one practicing the art. Examples of container types useful in the methods and compositions of the disclosure include bottles, syringes and cans (e.g., metal, glass or plastic).

As stated above, the instant disclosure also relates to a method of providing nutrition to preterm infants by adding the fortifier of the disclosure to human milk to adjust raw human milk to a desired nutritional content and administering the fortified human milk to a premature infant. The disclosure further provides a method of promoting growth of a premature infant by administering a fortified human milk to a premature infant.

The skim milk portion obtained is free of bacteria, fungi and spores. The filtered skim is then stored separately or recombined with the fat portion following filtration. Where the skim is stored separately it can later be recombined with a fat portion prior to consumption. Alternatively, the skim portion can be consumed. The skim and/or recombined milk can be stored for long periods of time preferably at below room temperature and more preferably at 4° C.

Figure 6:
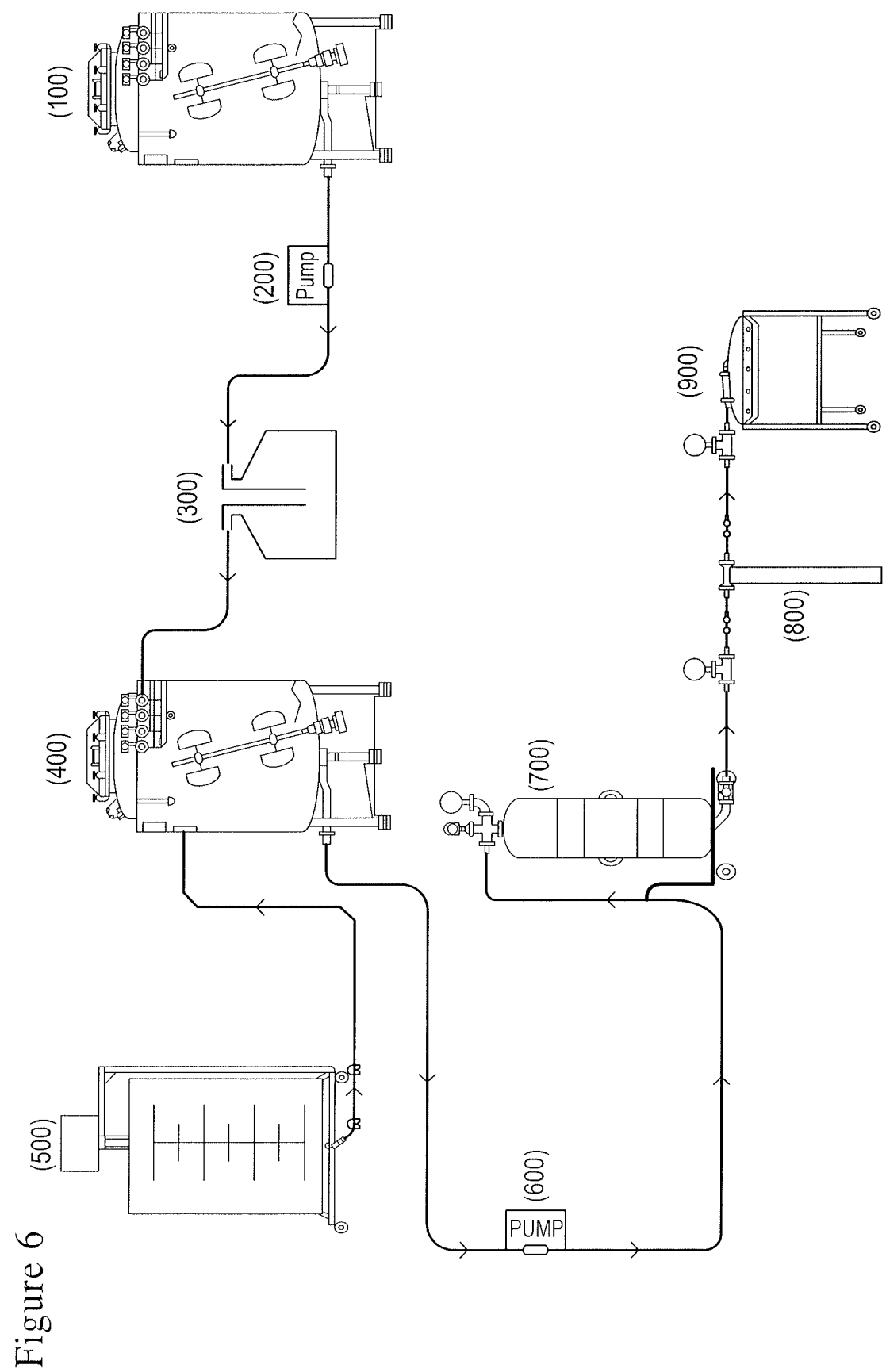
FIG. 6 depicts a representative process for filtering skim milk fraction according to the present invention.

Exemplary equipment (also referred to herein as apparatus) that can be used in the present invention is illustrated in FIG. 6. A jacketed process vessel (100), connected to a cold glycol system to maintain temperature of the vessel, is filled with raw human milk.

The jacketed process vessel (100) is connected to pump (200) which is connected to a milk separator (300). The skim port of the milk separator (300) is connected to a receiving jacketed process vessel (400). The receiving jacketed process vessel (400) is connected to a cold glycol system to maintain temperature of the vessel. The raw human milk is pumped, with pump (200), from the jacketed process vessel (100) through the milk separator (300) with the skim fraction flowing to the receiving jacketed process vessel (400). As a result the receiving jacketed process vessel (400) holds the skim fraction of raw human milk.

As used herein and depending on the particular context, equipment may refer to individual components or pieces of equipment, or refer collectively to two or more different components or pieces of equipment, or refer to all of the components or pieces of equipment used in the processes of the present invention. The various components of the equipment can be in direct physical contact as in a continuous, linked system within a single production plant, or alternatively, one or more individual components or pieces of the equipment can be physically separated as necessary. Thus, in some embodiments, all of the exemplary equipment shown in the figures can be together in the same or different rooms, whether or not they are directly connected. In some embodiments, one or more components or pieces of the equipment can be located in the same or different buildings, whether or not they are directly connected. In other embodiments, one or more components or pieces of the equipment may be located in the same or different geographical locations. Thus, the methods and systems of the present invention include having various components or pieces of the equipment physically separated within or between rooms and requiring physical transfer of the milk and milk products to the next component or piece of equipment in the system. Nothing in the present description is to be construed so that the equipment and systems shown and described herein need be in any particular physical order or arrangement as long as the steps of the present invention are accomplished as described herein. One skilled in the art will comprehend the various arrangements of equipment possible to accomplish the present invention.

The filter aid process vessel (500) is connected to the receiving jacketed process vessel (400) and filter aid process vessel (500) is filled with filter aid. The filter aid is transferred from the filter aid process vessel (500) to the receiving jacketed process vessel (400). During the process constant mixing is maintained in receiving jacketed process vessel (400).

The receiving jacketed process vessel (400) is connected to pump (600) which is then connected to input port of the pre-filter housing (700). The filter in the pre-filter housing (700) contains a filter with a pore size between 1 to 10 microns. The output port of the pre-filter housing (700) is connected to the input port of micro-filter housing (800). The filter in the micro-filter housing (800) contains a filter with a pore size between 0.2 and 1 micron. The output port of micro-filter housing (800) is connected to filtered skim jacketed process vessel (900), which is connected to a cold glycol system to maintain a desired temperature of the vessel.

The skim fraction of human milk mixed with filter aid in receiving jacketed process vessel (400) is pumped, with pump (600), through the pre-filter housing (700) which contains a filter with a pore size between 1 to 10 microns. The filtrate, the portion of the human milk skim fraction that passes through the filter, next goes through the micro-filter housing (800). The filtrate from this operation is captured in filtered skim jacketed process vessel (900). This filtered skim human milk consists of no, or a lowered, bacterial content (relative to the milk before microfiltration), with a minimum change in the fat and protein content. The filtrate fraction may then be used directly to make other products, such as human skim milk, human whole milk, or human milk fortifier made from 100% human milk.

The filtrate fraction superior to human milk obtained by conventional pasteurization techniques (ultra-high temperature and pressure) that would kill spore forming and psychrophilic bacteria like *Bacillus cereus* since those pasteurization techniques also change the form and function of human milk fats and proteins. Further, the human milk obtained in accordance with the present invention is safer because bacteria, such as the psychrophilic bacteria, especially *Bacillus cereus*, can be removed by the present invention.

The first concentrate fraction, which is the portion of the human skim milk fraction that is retained by and recovered from the retaining membrane surface of the pre-filter (700), consists of human milk with an increased bacterial content and the filter aid that was added to the human skim fraction in jacketed process vessel (400). Thus, the concentrate fraction is subsequently discarded due to its increased bacterial and filter aid content.

The second concentrate fraction, which is the portion of the human skim milk fraction that is retained by and recovered from the retaining membrane surface of the micro-filter (800) also consists of human milk with an increased bacterial content and is therefore also subsequently discarded.

The resulting filtrate is free of filter aid and contains, if any, a negligible level of bacteria. In certain embodiments, the resulting filtrate is pasteurized at low temperatures for at least 30 minutes in further processing steps in order to kill any remaining bacteria.

Filtration

In the present invention the filtration is performed in two steps: pre-filtration with a filter aid and microfiltration. The particular physical form of the membranes is not critical. Thus, the membrane medium may take the form of discs or cylinders, for example. In general, the pre-filter and micro-filter comprises of a membrane. The human milk fractions are pushed through the filter using a pump, for example a peristaltic pump, to force the product through the membranes of the filter.

Pre-filtration is used to filter large particles out of the human milk fraction before the product is filtered through a microfilter. This is necessary because the human milk fraction has too many large particles per unit volume and would clog the microfilter. However, even using a pre-filtration step (pore size between 1.0 to 10 microns), the human milk fraction can clog the pre-filter. This is caused by compressible solids in the human milk, forming an impermeable mass which would plug the filter. To remedy this situation caused by compressible solids, a filter aid is mixed with the human milk fraction.

Filters

Filters used in the filtration and/or microfiltration processes described herein may comprise any essentially commercially available filter materials and/or filter assemblies. Typical filter materials may be substantially unreactive (e.g., they will not chemically react with and/or modify the materials passing there through) and generally will not interact with (e.g., absorb or adsorb) materials which are small enough to pass through the pores in the filter material. An exemplary filter material employed in commercially available filters and/or filter assemblies, and which may be suitable for use in the present filtration and/or microfiltration process, is polytetrafluoroethylene (PTFE), although many other equivalent polymer filter materials are commercially available and may be employed in the present filtration and/or microfiltration processes. For example, other suitable filter materials may include nylon, polypropylene, polytetrafluoroethylene (PTFE), and glass microfiber. Furthermore, filter materials as described herein may exhibit differing degrees of hydrophilicity or hydrophobicity, and accordingly, a filter material may be selected to minimize electrostatic interactions with solids in the milk fraction to be filtered.

Pore sizes may be selected for desired filtration results (e.g., a target *B. cereus* CFU count after filtration). Filter pore sizes may be less than about 5 μm (e.g., less than about 4 μm, less than about 3 μm, less than about 2 μm, less than about 1 μm, less than about 0.9 μm, less than about 0.8 μm, less than about 0.7 μm, less than about 0.6 μm, less than about 0.5 μm, less than about 0.4 μm, less than about 0.3 μm, less than about 0.2 μm, less than about 0.1 μm, or any other value or range of values therein or there below).

Filter Aids

The term "filter aid" as used herein refers to a particulate material, typically having a high porosity and a low density. Exemplary filter aids may include diatomaceous earth, generically known as Celite or keiselguhr, or known by numerous proprietary trade names under which various untreated and treated varieties of diatomaceous earth are sold. Filter aid, Celite and diatomaceous earth (and grammatical variations thereof or various proprietary trade names thereof) may be used interchangeably herein.

Diatomaceous earth comprises fossilized remains of diatoms, a type of hard-shelled algae. These fossilized remains are highly permeable and porous, and accordingly, are suitable for filtration applications. However, synthetically produced materials may also be employed (e.g., polymeric materials, etc.) provided they do not chemically modify or react with the milk in an undesired fashion. Examples of useful filter aids may include silica, wood cellulose and perlite. In addition, natural or synthetic filter aids should have sufficient porosity to allow the skim milk product to flow freely there through whilst effectively retaining milk fats and/or other solids in the filter aid pad formed during a filtration process.

The filter aid may have an average particle size of from about 1 μm to about 100 μm (e.g., about 1 μm, about 2 μm, about 5 μm, about 10 μm, about 15 μm, about 20 μm, about 30 μm, about 40 μm, about 50 μm, about 75 μm, about 100 μm, or any other value or range of values therein). The filter aid is typically selected with a particle size larger than the pores of the filter through which the filtrate will pass. The particulate filter aid may have relatively uniform particles sizes, or may have a range of particle sizes (e.g., as described above). The filter aid may be sterile, and may optionally be further chemically treated or modified (e.g., the pH thereof may be acidic or basic, the material may be calcined, etc.). Such chemical treatment or modification may assist in removal of certain components in the milk product (e.g., those which may be precipitated on contact with acidic or basic filter aid). Alternatively, treatment such as calcining may harden the filter aid particles, providing additional mechanical strength to the filter aid such that it does not compress or mechanically deform under pressure during a filtration process.

Filter aids may be used in the form of a "pad" or layer through which a suspension may be passed, to remove and/or retain suspended particulate matter. However, since filter aids are highly porous materials, and also highly absorbent, they may be suspended in the fluid to be filtered (e.g., skim milk), absorbing fluid from the mixture to be filtered and forming a slurry. After mixing to form a slurry including the filter aid, the slurry may then be passed over a conventional filter or micro filter (e.g., as described herein). The filter retains the filter aid and entrained solids in the solution (i.e., the retentate or concentrate), and as the suspension passes over and the filter and filtrate passes through, the filter aid builds up into a "pad" containing entrained solids, which itself continues to act as a filter, effectively forming a three-dimensional filter which continues to trap and remove solids whilst still allowing fluid or very fine particulate matter to pass through. Since the filter aid is highly porous, the pad may continue to build up without plugging the filter through which the filtrate passes, nor the filter aid pad.

In the present filtration process and methods, filter aid may be added in amounts ranging from about 10 grams to about 100 grams of filter aid per 500 mL milk (e.g., about 20 grams to about 60 grams, about 30 grams to about 50 grams, or any other value or range of values therein). The amount of filter aid may be selected to maximize filtration and/or minimize filter clogging while minimizing the amount of filter aid required. In some embodiments, the filter aid is present at about 20 g/L, about 25 g/L, about 30 g/L, about g/L, about 40 g/L, about 45 g/L, or about 50 g/L.

In the present filtration process and methods, filter aid may be selected with a permeability such that solids which may plug a downstream filter, or undesired solids (e.g., bacteria), are removed by the filter aid, while other desirable solids (e.g., proteins) are allowed to pass through the filter aid. "Permeability" as used herein refers to the measure of the ability of a porous material to allow fluids to pass through it. Thus, filter aids suitable for use in the present methods may have a permeability (Darcy) ranging from about 0.100 to about 1.000, from about 0.200 to about 0.800, from about 0.300 to about 0.700, or about 0.400 to about 0.600. Alternatively, the filter aid may have a permeability of about 0.100, about 0.200, about 0.300, about 0.400, about 0.500, about 0.600, about 0.700, about 0.800, about 0.900 or about 1.000. Thus, in certain embodiments, the filter aid may be selected with permeability such that larger solids are captured, while proteins are allowed to pass, minimizing protein losses.

In some embodiments, the filter aid has a permeability of about 0.100 to about 0.500, and is employed at a loading (i.e., concentration in the milk fraction) of about 25 g/L to about 50 g/L. In other embodiments, the filter aid has a permeability of about 0.300 to about 0.400, and is employed at a loading of about 30 g/L to about 45 g/L. In still other embodiments, the filter aid has a permeability of about 0.300 to about 0.400, and is employed at a loading of about 35 g/L to about 40 g/L. In certain embodiments, the filter aid has a permeability of about 0.300 and is employed at a loading of 25 g/L to about 50 g/L. In other embodiments, the filter aid has a permeability of about 0.300 and is employed at a loading of about 50 g/L.

As described above, the filter aid prevents compressible solids from forming an impermeable mass which would plug a conventional filter. These compressible solids are captured, along with bacterial content and the entire filter aid, in the concentrate of the pre-filter. The resulting filtrate contains a minimal amount of compressible solids, a smaller amount of bacterial content, and no filter aid. With the compressible solids captured in the concentrate, the filtrate from the pre-filtration process is passed through a microfilter with a pore size between 0.2 and 1.0 microns.

Microfiltration Microfiltration is used on the filtrate from the pre-filtration step. With almost all the compressible solids captured in the pre-filtration step, the filtrate can flow through the microfilter, with a pore size between about 0.2 and about 1.0 micron, with a minimum of compressible solids to clog the microfilter. The concentrate of the microfiltration step will contain the remaining compressible solids and bacterial content from the pre-filtration step, including *Bacillus cereus*. The resulting filtrate will contain essentially human milk free from bacterial contamination.

Ultrafiltration

In some embodiments, the microfiltered milk is further ultrafiltered. According to one embodiment, an ultrafiltration membrane used to filter microfiltered skim milk is sized to prevent the passage of any substance with a molecular weight greater than 40 kDa. Such excluded substances include, but are not limited to: milk protein and milk fat. Alternately, ultrafiltration membranes which prevent the passage of any substance with a molecular weight greater than 1-40 kDa and any range therein may also be used. Typically filters comprising about 0.45 um or smaller (e.g., about 0.2 μm) can be used. Typically a 0.2 μm filter will be used. In some embodiments graded filtration can be used (e.g., a first filtration at about 0.45 μm and a second at about 0.3 μm and a third at about 0.2 μm, or any combination thereof). The separation of fat from the skim results in ease of filtration.

The sterilization can be performed by known methods, such as filtration or tangential filtration, using appropriate depth filters or membrane filters.

The following milk proteins can be trapped by the ultrafiltration membrane (molecular weights are noted in parenthesis): lactalbumin (~14 kDa); casein (~23 kDa); lactoglobulin (~37 kDa); albumin (~65 kDa); and immunoglobulins (>100 kDa). Ultrafiltration membranes having a 3.5 kDa or less molecular weight cut-off are available, for example, from Advanced Membrane Technology, San Diego, Calif., and Dow Denmark, Naskov, Denmark, respectively. Ultrafiltration membranes made of ceramic materials may also be used. Ceramic filters have an advantage over synthetic filters. Ceramic filters can be sterilized with live steam.

A pressure gradient is typically applied across the ultrafiltration membrane to facilitate filtration. Typically, the pressure gradient is adjusted to maintain a desired filter flux through the membrane. In one aspect, the ultrafilter membrane is first primed with a small amount of milk and the permeate discarded, prior to beginning filtration. Priming of the filter in this manner is believed to be advantageous to filtering efficiency.

General

After microfiltration the concentrate, both from the pre-filter and microfiltration steps, may be discarded in any acceptable manner.

The method of this invention may be used to advantage where the desired end product is whole human milk, standardized human milk, human milk fortifier, or skim human milk.

The flux rates through a bacterially retentive membrane, of human milk with a lowered fat content, are normally higher than the flux rates of human milk with a high fat content. In certain situations it is more advantageous to produce human milk with a higher fat content, such as about 3.5% or about 9.0%, by combining filtered skim human milk with a pasteurized human milk fat fraction. This fat fraction can be a cream fraction with a minimum fat content of about 10%.

This invention is further illustrated by the following examples that should not be construed as limiting. Those of skill in the art should, in light of the present disclosure, appreciate that many changes can be made to the specific embodiments which are disclosed and still obtain a like or similar result without departing from the spirit or scope of the invention.

EXAMPLES

Materials and Methods

Method A: Temperature Adjustment of Human Milk

The human milk employed in the following examples was obtained from human milk donors. The temperature of the human milk was adjusted to a suitable process temperature (about 20° C. to about 30° C.) in a 500 L jacketed processing vessel connected to a glycol system.

Method B: Separation of Cream and Skim Fractions of Human Milk

The jacketed processing vessel with raw human milk was connected to a Westfalia milk separator. The cream and skim ports of the Westfalia separator were connected to similar processing vessels. Approximately 10 liters of skim human milk fraction and 2 liters of cream milk fraction were diverted to high density polyethylene containers for filtration. Both fractions were stored a refrigerator (about 2° C. to about 8° C.) until ready for use in filtration.

Method C: Introduction of Bacteria into Human Milk Fractions

In experiments artificial seeding of the human milk fraction was used to demonstrate the very high titer reduction possible with the present invention. Bacterial inoculum, (including *Bacillus cereus*), was added to the human milk fractions. This was accomplished by adding inoculum into a process vessel of human milk fraction during constant mixing. Enough inoculum is mixed with the human milk fraction to achieve a minimum of 300 colony forming unit per milliliter (CFU/mL).

Method D: Bacterial Assay Tests

Since the inoculum used to seed the human milk fractions was *Bacillus cereus*, Mannitol-Egg Yolk-Polymyxin agar (MYP agar) was used since it is designed to be both selective and differential for *Bacillus cereus*. When testing for *Bacillus cereus*, 1 mL samples of the human milk product were plated over three MYP agar plates with each plate containing 0.33 mL of sample. The plates were incubated for 24 hours at 32° C. and read. Any pink-red colonies that are also lecithinase-positive, seen as a zone of precipitate around the colonies, are presumptively considered to be *Bacillus cereus*.

Method E: Macronutrient Assay Tests

Before and after the milk fraction has been put through the filtration process, it is desirable to measure the fat, protein, carbohydrates, and total calorie content of the final filtrate. For the experiments in this document, an Acudairy infrared milk analyzer, manufactured by Sterling Instruments, Westfield, N.Y., USA was used to measure the macronutrients.

Filtration Apparatus

The Pre-Filter

The pre-filters used in the experiments were Filtrox Filtrodisc BioSD mini capsule filters. These filters are single use designed for cell separation. The filters were manufactured by Filtrox AG, St. Gallen, Switzerland.

The Filter Aid Media

The filter aid media used in the experiment was Celpure® which is manufactured by Advanced Minerals Corporation, Goleta, Calif., USA.

The Microfilter

The microfilter used in the experiments was a Meissner PTFE membrane capsule filter. Meissner filters are manufactured by Meissner Filtration Products, INC, Camarillo, Calif., USA.

Method F: Filtration Setup

A Watson-Marlow peristaltic pump was setup with quarter inch tubing. The tubing from the pump was connected first to the Filtrox Filtrodisc BioSD mini capsule filter input. The output of the Filtrox Filtrodisc BioSD mini capsule filter was then connected, via ¼" tubing, to the input of the Meissner PTFE membrane capsule filter. The result was the two filters were connected in series with the projected flow of the product first through the Filtrox Filtrodisc BioSD mini capsule filter, then the Meissner PTFE membrane capsule filter. Using quarter inch tubing, the output of the Meissner PTFE membrane capsule filter led to a 500 mL collection vessel.

Method G: Filtration of Milk Fraction

Filter Preparation

Once the filtration setup was complete, the filters must be wetted with deionize (DI) water before a milk fraction can be passed through the filters. To accomplish the wetting of the filters, a vessel containing at DI water was connected to the input tubing connected to the Watson-Marlow peristaltic pump in the filtration setup described in Method F. At this point, at least 100 mL of DI water is pumped through the filters to wet the filter in preparation for filtration of milk fractions.

Fraction Preparation for Filtration

Before the milk fraction can be run through the filter, the filter aid must be added to the milk fraction. For the experiments, between about 20 grams to about 60 grams of Celpure filter aid is added for every 500 mL of milk fraction.

Filtration

The input to the Watson-Marlow peristaltic pump, the starting point of the filtration setup described in Method F, is connected to a vessel containing the milk fraction with the added Celpure. The pump is set to achieve a flow rate between about 15 mL to about 40 mL per minute. When the pump starts, the vents on each filter were opened to prime the filters at the start of the pumping process, and then were closed when the system was primed. The milk fraction with the Celpure was pumped across the filter until the pre-filter Filtrox Filtrodisc BioSD mini capsule filter filled with Celpure (approximately 20 grams of Celpure). The final filtrate, the product passed through both the pre-filter and microfilter, yielded between about 167 mL to about 450 mL.

Macronutrient and Bacterial Measurements

After filtration was completed, macronutrient and bacterial measurements were conducted. The measurements were conducted as described in Method D and Method E and were conducted on the initial milk fraction, the filtrate after the pre-filter, and the final filtrate after microfiltration.

Example I

At room temperature, about 500 mL of raw milk fraction was mixed with about 40 g of Celpure® 300. The mixture was spiked with approximately 600 CFU/mL of *Bacillus cereus* as described in Method C. The mixture was pumped at the rate of about 30 mL/min. The filtration setup followed Method F and filtration followed Method G. However, the feed pressure started to rise shortly after starting the pumping of the product, indicating plugging of the pre-filter. The results of macronutrient and bacterial assays are documented in Table 1. Note: BC CFU/mL=the number of *B. cereus* colony forming units per milliliter.

TABLE 1

| Product | BC CFU/mL | Fat | Protein | Carbohydrates |
|---|---|---|---|---|
| Whole Milk, | 577 | 3.29% | 1.02% | 7.51% |
| Whole Milk, 1 micron pre-filter | <1 | 0.13% | 0.84% | 7.19% |

The results above indicate that pre-filtering whole milk, while effective in reducing the *B. cereus* concentration, leads to a very low flow rate and plugging of the filter with compressible solids. Therefore, for the purpose of large scale production, it is advantageous to separate cream from skim and pre-filter

Example II

At room temperature, about 500 mL of skim milk fraction was mixed with about 40 g of Celpure® 300. The mixture was spiked with approximately 600 CFU/mL of *Bacillus cereus* as described in Method C. The mixture was pumped at the rate of about 30 mL/min. The filtration setup followed Method F and filtration followed Method G. The microfilter had a pore size of about 0.2 microns. The feed pressure stayed steady throughout the process, indicating no plugging of the filters. The results of macronutrient and bacterial assays are documented in Table 2.

TABLE 2

| Product | BC CFU/mL | Fat | Protein | Carbohydrates |
|---|---|---|---|---|
| Skim Milk, | 577 | 0.31% | 1.01% | 7.37% |
| Skim Milk, 1 micron pre-filter | 29 | 0.15% | 0.90% | 7.19% |
| Skim Milk, 0.2 micron microfilter | <1 | 0.08% | 0.73% | 8.08% |

The results above indicate that a pre-filter having pore size of about 1 micron is no longer plugged when a filter aid such as diatomaceous earth is added into the skim milk before filtration. In addition, the *Bacillus cereus* concentration in the skim milk is effectively reduced by filtrating the skim milk through the pre-filter and a microfilter having pore size of about 0.2 micron, while the concentrations of protein and carbohydrates in the skim milk are not significantly affected by this process.

Example III

At room temperature, about 500 mL of skim milk fraction was mixed with about 40 g of Celpure® 300. The mixture was spiked with approximately 600 CFU/mL of *Bacillus cereus* as described in Method C. The mixture was pumped at the rate of about 30 mL/min. The filtration setup followed Method F and filtration followed Method G. The microfilter had a pore size of about 0.4 microns. The feed pressure stayed steady throughout the process, indicating no plugging of the filters. The results obtained from Method D and Method E are documented on Table 3.

TABLE 3

| Product | BC CFU/mL | Fat | Protein | Carbohydrates |
| --- | --- | --- | --- | --- |
| Skim Milk, | 577 | 0.31% | 1.01% | 7.37% |
| Skim Milk, 1 micron pre-filter | 29 | 0.15% | 0.90% | 7.19% |
| Skim Milk, 0.4 micron microfilter | <1 | 0.10% | 0.82% | 7.24% |

The results above indicate that the *Bacillus cereus* concentration in the skim milk is effectively reduced by filtrating the skim milk through a pre-filter and a microfilter having pore size of about 0.4 micron, while the concentrations of protein and carbohydrates in the skim milk are not significantly affected by this process.

Example IV

At room temperature, about 500 mL of skim milk fraction was mixed with about 40 g of Celpure® 300. The mixture was spiked with approximately 10,000 CFU/mL of *Bacillus cereus* as described in Method C. The mixture was pumped at the rate of about 30 mL/min. The filtration setup followed Method F and filtration followed Method G. The microfilter had a pore size of about 0.6 microns. The feed pressure stayed steady throughout the process, indicating no plugging of the filters. The results obtained from Method D and Method E are documented in Table 4.

TABLE 4

| Product | BC CFU/mL | Fat | Protein | Carbohydrates |
|---|---|---|---|---|
| Skim Milk, | TNTC* | 0.30% | 0.84% | 6.68% |
| Skim Milk, 1 micron pre-filter | TNTC* | 0.12% | 0.72% | 6.63% |
| Skim Milk, 0.6 micron microfilter | <1 | 0.10% | 0.60% | 6.61% |

*To Numerous to Count

The results above indicate that the *Bacillus cereus* concentration in the skim milk is effectively reduced by filtrating the skim milk through a pre-filter and a microfilter having pore size of about 0.6 micron, while the concentrations of protein and carbohydrates in the skim milk are not significantly affected by this process.

Example V

At room temperature, 1,009.8 mL of skim milk fraction was pooled. The skim milk fraction was spiked with approximately 5,000 CFU/mL of *Bacillus cereus* as described in Method C. From the 1,009.8 mL of skim milk fraction, 9.8 mL was taken to conduct a nutritional analysis, leaving 1,000 mL of skim milk fraction. To the 1,000 mL of skim milk fraction, about 22 g of Celpure® 300 was added. Of the 1,000 mL of skim milk fraction, about 135 mL were filtered using the filtration setup followed Method F and filtration followed Method G. The microfilter had a pore size of about 0.6 microns. The feed pressure stayed steady throughout the process, indicating no plugging of the filters. Cream that was tested to have <1 CFU/mL of *Bacillus cereus* and a known nutritional value was added to the filtered skim in the amount of 15.4 mL to bring the caloric, fat, protein, can carbohydrates to the level expected in Standardized Human Milk. The results obtained from Method D and Method E are documented on Table 5.

TABLE 5

| Product | BC CFU/mL | Fat | Protein | Carbohydrates |
|---|---|---|---|---|
| Skim Milk, | TNTC* | 0.42% | 1.10% | 7.35% |
| Skim Milk, 0.6 micron microfilter | <1 | 0.11% | 0.94% | 7.35% |
| Final product (filtered skim with cream addition) | <1 | 3.80% | 1.04% | 7.62% |

*To Numerous to Count

Scale-Up Examples

Example A

Summary

Approximately 30 L of cow's milk was mixed with approximately 90 L of deionized water to provide about 120 L of diluted cow's milk, which was treated with *Bacillus cereus*, then placed in a 500 L tank with a bag liner and at approximately 23° C. CelPure® 300 was added to provide a final filter aid/cow's milk ratio of about 50 g/L. A peristaltic pump was prepared and tubing fed through the same, connecting the bag-lined tank to first and second filters, the "depth filter" and "final filters," respectively. Filter housings were disassembled and cleaned/sanitized prior to the filtration experiment. Two (2) 30" "final filter" housings were also cleaned and sanitized. All tubing and components, e.g., clamps, gaskets, fittings, etc. were sanitized. 50' of new tubing was employed for the run. Stylux® SMO.6-3F6RS filters (Meissner Filtration Products, Inc.) with about 0.6 micron pore size made from Polyethersulfone (PES) were employed. Cow's milk was collected in sanitized barrels either downstream of the depth filter or the final filters.

Celpure 300 (permeability of about 0.300) at a concentration of 50 g/L with the SteriLux SMO.6-3F6RS filters made from polyethersulfone (PES) was effective in filtering *Bacillus cereus* from cow's milk to a level of <1 CFU/mL.

Procedure

Cow's milk was mixed and dispensed in the bag-lined 500 L tank. Approximately 10 feet of tubing was connected to the tank outlet and clamped off. A magnetic mixer was connected to the tank, and set at about 50 RPM. Samples of the cow's milk were obtained in duplicate. *Bacillus cereus* inoculate was added to the tank while mixing. RPM was adjusted for mixing with minimal foaming, and the cow's milk was allowed to mix for approximately 15 minutes. Samples of the cow's milk were then obtained in duplicate. CelPure® 300 was dispensed into the tank, and the mixer was set to about 200 RPM.

The filter housings were opened, and a Stylux® SMO.6-3F6RS 30 inch filter with about 0.6 micron pore size made from polyethersulfone (PES) was placed in each housing. Housings on all the filters were secured, and the filters wetted in the housings and gravity-drained. The tank outlet was connected to the inlet of the depth filter. Tubing was run from the top outlet of the filter housing to the top opening of the tank for recirculation, if needed. Tubing from the bottom of the tank was run through the peristaltic pump and connected to the depth filter inlet. Tubing from the depth filter outlet was run to a collection barrel.

Final filters, Stylux® SMO.6-3F6RS 30 inch filters with about 0.6 micron pore size made from polyethersulfone (PES), were fed from the collection barrel. Tubing was connected to both inlets of the final filter, and a "tee" was placed on the inlet lines with clamps to selectively direct fluid to either filter. The tubing outlet of both filters was fed into collection barrels The drain valve/clamp at the bottom the tank was opened and the pump started. Pump speed was gradually increased to approximately 10 L/min. Cow's milk was observed filling up the housing, and the housing vent valve was closed after product was observed coming out. The recirculation tubing was unclamped so the product was fed back to the tank. Pressure of the housing was recorded every 5 minutes. After recirculation, the clamp at the outlet of the depth filter was opened. The clamp at the housing outlet was opened allowing product to flow to the collection barrel, and the recirculation tubing to the tank was clamped off. The process was continued until all product from the tank was filtered. Samples from the filtrate were obtained.

The final filters were wetted and drained, and then the tubing from the collection barrel to the pump was primed, and the pump turned on and slowly brought to approximately 4 L/min. Product was observed in the filter housing #1 sight glass and the vent valve opened until product was observed, then the vent was closed. The filter housing pressure was recorded. The outlet clamp of the final filter was opened and product collected in the collection barrel until all product from the first filtering had been filtered. Samples from the second filtrate were obtained.

Example B

Summary

A 500 L tank with bag liner was filled with approximately 147 L of *Bacillus cereus* treated skim human milk at approximately 23° C. CelPure® 1000 was added to provide a final filter aid/milk ratio of about 25 g/L. A peristaltic pump was prepared and tubing fed through the same, connecting the bag-lined tank to first and second filters, the "depth filter" and "final filters," respectively (and corresponding to the pre-filter and microfilter of Examples I-V, above). Filter housings were disassembled and cleaned/sanitized prior to the filtration experiment, and all tubing and components, e.g., clamps, gaskets, fittings, etc. were also sanitized. 50' of new tubing was employed. Stylux® SMO.6-3F6RS filters with about 0.6 micron pore size made from polyethersulfone were employed. Milk was collected in sanitized barrels either downstream of the depth filter or the final filters.

Using Celpure® 1000 (permeability of about 1.000) at about 25 g/L, skim human milk passed the depth filters but the final filters clogged immediately and the run was terminated.

Procedure

The same procedure was used in the present experiment as in Example A except human skim milk was used herein instead of cow's milk. Milk was thawed and dispensed in the bag-lined 500 L tank. Approximately 10 feet of tubing was connected to the tank outlet and clamped off. A magnetic mixer was connected to the tank, and set at about 50 RPM. Samples of the milk were obtained in duplicate. *Bacillus cereus* inoculate was added to the tank while mixing. RPM was adjusted for mixing with minimal foaming, and the milk was allowed to mix for approximately 15 minutes. Two samples of the milk were then obtained. CelPure® 1000 (6 kg) was dispensed into the tank, and the mixer was set to about 200 RPM.

The filter housings were opened, and a Stylux® 30 inch filter was placed in each housing. Housings on all the filters were secured, and the filters wetted in the housings and gravity-drained. The tank outlet was connected to the inlet of the depth filter. Tubing was run from the top outlet of the filter housing to the top opening of the tank for recirculation, if needed. Tubing from the bottom of the tank was run through the peristaltic pump and connected to the depth filter inlet. Tubing from the depth filter outlet was run to a collection barrel.

Final filters were to be fed from the collection barrel. Tubing was connected to both inlets of the final filter, and a "tee" was placed on the inlet lines with clamps to selectively direct fluid to either filter. The tubing outlet of both filters was fed into collection barrels The drain valve/clamp at the bottom of the tank was opened and the pump started. Pump speed was gradually increased to approximately 10 L/min. Milk was observed filling up the housing, and the housing vent valve was closed after product was observed coming out. The recirculation tubing was unclamped so the product was fed back to the tank.

Pressure of the housing was recorded every 5 minutes. After recirculation, the clamp at the outlet of the depth filter was opened. The clamp at the housing outlet was opened allowing product to flow to the collection barrel, and the recirculation tubing to the tank was clamped off. The process was continued until all product from the tank was filtered. Samples from the filtrate were obtained.

The final filters were wetted and drained, and then the tubing from the collection barrel to the pump was primed, and the pump turned on. Surprisingly, notwithstanding the fact that the same procedure was successfully used in Example A, each final filter in the present Example clogged immediately upon introduction of milk, and the run was terminated.

Example C

Summary

A 500 L tank with bag liner was filled with approximately 240 L of *Bacillus cereus* treated skim human milk at approximately 23° C. CelPure® 1000 was added to provide a final filter aid/milk ratio of about 25 g/L. A peristaltic pump was prepared and tubing fed through the same, connecting the bag-lined tank to first and second filters, the "depth filter" and "final filters," respectively (and corresponding to the pre-filter and microfilter of Examples I-V, above). Filter housings were disassembled and cleaned/sanitized prior to the filtration experiment, and all tubing and components, e.g., clamps, gaskets, fittings, etc. were also sanitized. 50' of new tubing was employed. Sterilux VMH0.6-3F6RS filters made from polyvinylidene fluoride (PVDF) (Meissner) were employed. Milk was collected in sanitized barrels either downstream of the depth filter or the final filters.

Using Celpure® 1000 (permeability of about 1.000) at about 25 g/L, the depth filter plugged and the run was terminated.

Procedure

Milk was thawed and dispensed in the bag-lined 500 L tank. Approximately 10 feet of tubing was connected to the tank outlet and clamped off. A magnetic mixer was connected to the tank, and set at about 50 RPM. Samples of the milk were obtained in duplicate. *Bacillus cereus* inoculate was added to the tank while mixing. RPM was adjusted for mixing with minimal foaming, and the milk was allowed to mix for approximately 15 minutes. Two samples of the milk were then obtained. CelPure® 1000 (6 kg) was dispensed into the tank, and the mixer was set to about 200 RPM.

The filter housings were opened, and a Sterilux VMH0.6-3F6RS PVDF 30 inch filter was placed in each housing. Housings on all the filters were secured, and the filters wetted in the housings and gravity-drained. The tank outlet was connected to the inlet of the depth filter. Tubing was run from the top outlet of the filter housing to the top opening of the tank for recirculation, if needed. Tubing from the bottom of the tank was run through the peristaltic pump and connected to the depth filter inlet. Tubing from the depth filter outlet was run to a collection barrel.

Final filters (Sterilux VMH0.6-3F6RS PVDF) were to be fed from the collection barrel. Tubing was connected to both inlets of the final filter, and a "tee" was placed on the inlet lines with clamps to selectively direct fluid to either filter. The tubing outlet of both filters was fed into collection barrels The drain valve/clamp at the bottom the tank was opened and the pump started. Pump speed was gradually increased to approximately 10 L/min. Milk was observed filling up the housing, and the housing vent valve was closed after product was observed coming out. The recirculation tubing was unclamped so the product was fed back to the tank. Pressure of the housing was recorded every 5 minutes. After recirculation, the clamp at the outlet of the depth filter was opened. The pressure of the depth filter housing was observed to increase rapidly, and the depth filter plugged, terminating the experiment Example D Summary A 500 L tank with bag liner was filled with approximately 160 L of *Bacillus cereus* treated skim human milk at approximately 23° C. In contrast to the procedure employed in Example B, utilizing CelPure® 1000 and providing a final filer aid/milk ratio of about 25 g/L which resulted in filter clogging, here CelPure® 300 was added to provide a final filter aid/milk ratio of about 50 g/L. A peristaltic pump was prepared and tubing fed through the same, connecting the bag-lined tank to first and second filters, the "depth filter" and "final filters," respectively. Filter housings were disassembled and cleaned/sanitized prior to the filtration experiment. Two (2) 30" "final filter" housings were also cleaned and sanitized. All tubing and components, e.g., clamps, gaskets, fittings, etc. were sanitized. 50' of new tubing was employed for the run. In lieu of the Stylux filters used in Example B, which resulted in clogging, Sterilux VMH0.6-3F6RS PVDF filters were employed. Milk was collected in sanitized barrels either downstream of the depth filter or the final filters.

Celpure® 300 (permeability of about 0.300) at a concentration of about 50 g/L with Sterilux VMH0.6-3F6RS PVDF filters was effective in filtering *Bacillus cereus* from human skim milk to a level of <1 CFU/mL.

Procedure

Milk was thawed and dispensed in the bag-lined 500 L tank. Approximately 10 feet of tubing was connected to the tank outlet and clamped off. A magnetic mixer was connected to the tank, and set at about 50 RPM. Samples of the milk were obtained in duplicate. *Bacillus cereus* inoculate was added to the tank while mixing. RPM was adjusted for mixing with minimal foaming, and the milk was allowed to mix for approximately 15 minutes. Samples of the milk were then obtained in duplicate. CelPure® 300 was dispensed into the tank, and the mixer was set to about 200 RPM.

The filter housings were opened, and a Sterilux 30 inch filter was placed in each housing. Housings on all the filters were secured, and the filters wetted in the housings and gravity-drained. The tank outlet was connected to the inlet of the depth filter. Tubing was run from the top outlet of the filter housing to the top opening of the tank for recirculation, if needed. Tubing from the bottom of the tank was run through the peristaltic pump and connected to the depth filter inlet. Tubing from the depth filter outlet was run to a collection barrel.

Final filters were fed from the collection barrel. Tubing was connected to both inlets of the final filter, and a "tee" was placed on the inlet lines with clamps to selectively direct fluid to either filter. The tubing outlet of both filters was fed into collection barrels The drain valve/clamp at the bottom the tank was opened and the pump started. Pump speed was gradually increased to approximately 10 L/min. Milk was observed filling up the housing, and the housing vent valve was closed after product was observed coming out. The recirculation tubing was unclamped so the product was fed back to the tank. Pressure of the housing was recorded every 5 minutes. After recirculation, the clamp at the outlet of the depth filter was opened. The clamp at the housing outlet was opened allowing product to flow to the collection barrel, and the recirculation tubing to the tank was clamped off. The process was continued until all product from the tank was filtered. Samples from the filtrate were obtained.

The final filters were wetted and drained, and then the tubing from the collection barrel to the pump was primed, and the pump turned on and slowly brought to approximately 4 L/min. Product was observed in the filter housing #1 sight glass and the vent valve opened until product was observed, then the vent was closed. The filter housing pressure was recorded. The outlet clamp of the final filter was opened and product collected in the collection barrel until all product from the first filtering had been filtered. Samples from the second filtrate were obtained.

Results

I. Overall Volumetric Yield was 66.5%.

Starting volume in tank: 160 L

Volume collected after depth filter: 97 L (no post wash, filter plugged)

Volume collected after 1st final filter: 53 L

Volume collected after 2nd final filter: 32 L

Post wash of 1st final filter: 5 L

Post wash of 2nd final filter: 5 L

Total from final filter: 95 L

Holdup volume left in tank: 15 L

Holdup volume in depth filter inlet: 30 L

Holdup volume in depth filter outlet: 4 L

Total holdup volume: 49 L

Volumetric yield=100*(95 L/(160 L−15 L))=65.5%

II. Protein yield was 78.4%.

Starting protein: 0.97%

Protein after depth filter: 0.83%

Protein after 1st final filter: 0.78%

Protein after 2nd final filter: 0.79%

Protein after postwash: 0.76%

Protein yield=100*(0.76%/0.97%)=78.4%

III. *Bacillus cereus* levels in final product were <1 CFU/mL.

A. Starting *Bacillus cereus* load @24 hours 145 CFU/mL

Starting *Bacillus cereus* load @48 hours 500 CFU/mL

B. *Bacillus cereus* after depth filter @24 hours<1 CFU/mL
*Bacillus cereus* after depth filter @48 hours<1 CFU/mL

C. *Bacillus cereus* after final filter @24 hours<1 CFU/mL

*Bacillus cereus* after final filter @48 hours<1 CFU/mL

D. *Bacillus cereus* after post wash @24 hours<1 CFU/mL

*Bacillus cereus* after post wash @48 hours<1 CFU/mL

E. *Bacillus cereus* in final product @24 hours<1 CFU/mL

*Bacillus cereus* in final product @48 hours<1 CFU/mL

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

The invention claimed is:

1. A method for treating raw human milk to obtain microfiltered human milk having lower bacteria content compared to raw human milk, comprising:

(a) providing raw human milk;

(b) separating the raw milk into a cream fraction and a skim milk fraction, wherein the skim milk fraction contains about 1.0% to about 0.1% fat content;

(c) pre-filtering the skim milk fraction using a filter aid through one or more pre-filters to produce pre-filtered skim milk, wherein said filter aid is added to said skim milk fraction in a concentration of from about 20 g/L to about 50 g/L, and wherein said filter aid has a permeability of from about 0.100 D to about 0.300 D; and (d) microfiltering the pre-filtered skim milk obtained in step (c) through one or more microfilters to obtain microfiltered human skim milk.

2. The method of claim 1, wherein the filter aid is diatomaceous earth.

3. The method of claim 1, wherein the filter aid is added to the skim milk fraction obtained in step (b) to form a slurry.

4. The method of claim 3, wherein the slurry is passed through the said pre-filter to form the said pre-filtered skim milk.

5. The method of claim 1, wherein the microfiltered human skim milk obtained in step (d) further comprises the step of: concentrating said microfiltered human skim milk by ultrafiltration.

6. The method of claim 5, wherein the concentrated microfiltered human skim milk has about 5% to about 15% protein content.

7. The method of claim 1, wherein the method further comprises adding human milk cream into the microfiltered human skim milk to produce a whole human milk product.

8. The method of claim 1, wherein the bacteria comprise Bacillus species.

9. The method of claim 1, wherein the microfiltered skim milk fraction has no more than $10^1$ bacteria per milliliter.

10. The method of claim 3, wherein the filter aid in the skim milk fraction is about 2% w/v to about 5% w/v.

11. The method of claim 1, wherein the microfilters having an average pore size sufficient to reduce the bacterial content of the skim milk.

12. The method of claim 11, wherein the average pore size of the microfilters is about 0.2 to 1 micron.

13. The method of claim 1, wherein the pre-filters comprising an average pore size of about 1 to 10 microns.

14. The method of claim 1, wherein said filter aid has a concentration of about 50 g/L and a permeability of about 0.300 D.

* * * * *